US012654443B2

(12) United States Patent
Okamoto et al.

(10) Patent No.: US 12,654,443 B2
(45) Date of Patent: Jun. 16, 2026

(54) LIQUID DISCHARGE APPARATUS AND METHOD FOR DRIVING LIQUID DISCHARGE APPARATUS

(71) Applicant: SEIKO EPSON CORPORATION, Tokyo (JP)

(72) Inventors: Asami Okamoto, Matsumoto (JP); Akira Miyagishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

(21) Appl. No.: 18/617,053

(22) Filed: Mar. 26, 2024

(65) Prior Publication Data

US 2024/0326415 A1 Oct. 3, 2024

(30) Foreign Application Priority Data

Mar. 29, 2023 (JP) ................................ 2023-054090

(51) Int. Cl.
*B41J 2/045* (2006.01)
*B41J 2/01* (2006.01)
(Continued)

(52) U.S. Cl.
CPC ............. *B41J 2/04581* (2013.01); *B41J 2/01* (2013.01); *B41J 2/0451* (2013.01); *B41J 2/04541* (2013.01); *B41J 2/04563* (2013.01); *B41J 2/04573* (2013.01); *B41J 2/04588* (2013.01); *B41J 2/04596* (2013.01); *B41J 29/38* (2013.01);
(Continued)

(58) Field of Classification Search
CPC ........ B41J 2/04581; B41J 2/01; B41J 2/0451; B41J 2/04541; B41J 2/04563; B41J 2/04573; B41J 2/04588; B41J 2/04596; B41J 29/38; B41J 2/04593; B41J 2002/14354
See application file for complete search history.

(56) References Cited

U.S. PATENT DOCUMENTS

| | | | |
|---|---|---|---|
| 2015/0077463 | A1 | 3/2015 | Hosokawa |
| 2016/0279932 | A1 | 9/2016 | Kamiyanagi |
| 2018/0126738 | A1 | 5/2018 | Fukuda |

FOREIGN PATENT DOCUMENTS

| | | | |
|---|---|---|---|
| JP | 2000-153608 | A | 6/2000 |
| JP | 2015-058540 | A | 3/2015 |

(Continued)

*Primary Examiner* — Yaovi M Ameh
(74) *Attorney, Agent, or Firm* — WORKMAN NYDEGGER

(57) ABSTRACT

A first drive signal includes a first drive pulse that displaces a first piezoelectric element in a first period of a drive cycle, a second drive signal includes a first reference potential maintaining element that maintains a reference potential in a first start period including a start point of the drive cycle, a first potential maintaining element that maintains a first potential in a second period of the drive cycle following the first period, and a second reference potential maintaining element that maintains the reference potential in a first end period that starts after an end of the second period and includes an end point of the drive cycle, a vibration detection section detects a remaining vibration that occurs in a first discharge section in the second period, and a generation section maintains the first potential at a constant potential, regardless of a temperature detected by a temperature detection section.

8 Claims, 12 Drawing Sheets

(51) Int. Cl.
*B41J 29/38* (2006.01)
*B41J 2/14* (2006.01)

(52) U.S. Cl.
CPC .. *B41J 2/04593* (2013.01); *B41J 2002/14354* (2013.01)

(56) References Cited

FOREIGN PATENT DOCUMENTS

JP 2016-179628 A 10/2016
JP 2018-75789 A 5/2018
JP 2018075789 A * 5/2018 ............ B41J 2/0451

* cited by examiner

| | | TQ1 | TQ2 | TQ3 | TQ4 |
|---|---|---|---|---|---|
| DS (TARGET) | Qa | H | H | L | H |
| | Qb | L | L | L | L |
| | Qc | L | L | L | L |
| | Qs | L | L | H | L |
| DK (NEIGHBORING) | Qa | L | L | L | L |
| | Qb | H | H | H | H |
| | Qc | L | L | L | L |
| | Qs | L | L | L | L |
| DT (NORMAL) | Qa | L | L | L | L |
| | Qb | L | L | L | L |
| | Qc | H | H | H | H |
| | Qs | L | L | L | L |

FIG. 13

| | | TQ1 | TQ2 | TQ3 | TQ4 | TQ5 | TQ6 |
|---|---|---|---|---|---|---|---|
| DS (TARGET) | Qa | H | H | H | L | H | H |
| | Qb | L | L | L | L | L | L |
| | Qs | L | L | L | H | L | L |
| DK (NEIGHBORING) | Qa | L | L | L | L | L | L |
| | Qb | L | H | H | H | H | L |
| | Qs | L | L | L | L | L | L |
| DT (NORMAL) | Qa | L | L | L | L | L | L |
| | Qb | H | L | L | L | L | H |
| | Qs | L | L | L | L | L | L |

LIQUID DISCHARGE APPARATUS AND METHOD FOR DRIVING LIQUID DISCHARGE APPARATUS

The present application is based on, and claims priority from JP Application Serial Number 2023-054090, filed Mar. 29, 2023, the disclosure of which is hereby incorporated by reference herein in its entirety.

BACKGROUND

1. Technical Field

The present disclosure relates to a liquid discharge apparatus and a method for driving a liquid discharge apparatus.

2. Related Art

Liquid discharge apparatuses, such as an ink jet printer or the like, that discharge a liquid, such as an ink or the like, from a discharge section to form an image on a medium, such as recording paper or the like, have been widely known. In such a liquid discharge apparatus, a discharge abnormality in which a liquid cannot be normally discharged from a discharge section occurs and image quality of an image formed on a medium is degraded due to the discharge abnormality in some cases. In order to identify such a discharge abnormality, technologies related to discharge state determination in which a discharge state of a liquid in a discharge section is determined have been conventionally proposed. For example, JP-A-2015-058540 describes a technology related to discharge state determination in which a discharge state of a liquid in a discharge section is determined based on remaining vibration that occurs in the discharge section driven by a drive signal.

In a liquid discharge apparatus, discharge characteristics of the liquid from the discharge section fluctuate due to change in temperature, and thus, image quality of an image formed on a medium is degraded in some cases. Therefore, technologies related to temperature correction in which a waveform of a drive signal is corrected in accordance with an environmental temperature have been conventionally proposed. For example, JP-A-2000-153608 describes a technology related to temperature correction in which a reference potential that is a potential of a drive signal at a start point and an end point of a drive cycle in which the drive signal is supplied to a discharge section is adjusted in accordance with an environmental temperature.

However, in the known technologies above, when discharge state determination is performed while performing temperature correction, a reference potential of a drive signal supplied to some other discharge section than a determination target discharge section that is a target discharge section a discharge state of which is to be determined fluctuates in accordance with the environmental temperature. Therefore, in the known technologies, when the discharge state determination is performed while performing temperature correction, influence of the drive signal supplied to some other discharge section on the determination target discharge section varies in accordance with the environmental temperature. Accordingly, in the known technologies, when discharge state determination is performed while performing temperature correction, accuracy of discharge state determination is reduced due to change of the environmental temperature in some cases.

SUMMARY

A liquid discharge apparatus according to an aspect of the present disclosure includes: a liquid discharge head that includes a plurality of discharge sections including a first discharge section that discharges a liquid in a first pressure chamber in accordance with displacement of a first piezoelectric element, and a second discharge section that discharges a liquid in a second pressure chamber in accordance with displacement of a second piezoelectric element; a generation section that generates a first drive signal that displaces the first piezoelectric element, and a second drive signal that displaces the second piezoelectric element; a vibration detection section that, after the first drive signal is supplied to the first piezoelectric element, detects remaining vibration that occurs in the first discharge section; and a temperature detection section that detects a temperature of the liquid discharge head, and is characterized in that the first drive signal includes a first drive pulse that displaces the first piezoelectric element in a first period of a drive cycle, the second drive signal includes a first reference potential maintaining element that maintains a reference potential in a first start period including a start point of the drive cycle, a first potential maintaining element that maintains a first potential in a second period of the drive cycle following the first period, and a second reference potential maintaining element that maintains the reference potential in the first end period that starts after an end of the second period and includes an end point of the drive cycle, the vibration detection section detects the remaining vibration that occurs in the first discharge section in the second period, and the generation section corrects the reference potential, based on the temperature detected by the temperature detection section, and maintains the first potential at a constant potential, regardless of the temperature detected by the temperature detection section.

A method for driving a liquid discharge apparatus according to an aspect of the present disclosure is characterized in that, in a method for driving a printer including a liquid discharge head that includes a plurality of discharge sections including a first discharge section that discharges a liquid in a first pressure chamber in accordance with displacement of a first piezoelectric element, and a second discharge section that discharges a liquid in a second pressure chamber in accordance with displacement of a second piezoelectric element, a generation section that generates a first drive signal that displaces the first piezoelectric element, and a second drive signal that displaces the second piezoelectric element, a vibration detection section that, after the first drive signal is supplied to the first piezoelectric element, detects remaining vibration that occurs in the first discharge section, and a temperature detection section that detects a temperature of the liquid discharge head, the first drive signal includes a first drive pulse that displaces the first piezoelectric element in a first period of a drive cycle, the second drive signal includes a first reference potential maintaining element that maintains a reference potential in a first start period including a start point of the drive cycle, a first potential maintaining element that maintains a first potential in a second period of the drive cycle following the first period, and a second reference potential maintaining element that maintains the reference potential in the first end period that starts after an end of the second period and includes an end point of the drive cycle, and the method incudes: detecting the remaining vibration that occurs in the first discharge section in the second period; correcting the reference potential, based on the temperature detected by the temperature detection section; and maintaining the first potential at a constant potential, regardless of the temperature detected by the temperature detection section.

BRIEF DESCRIPTION OF THE DRAWINGS

FIG. 13 is a table illustrating a relationship between an individual designation signal and connection state designation signals in the unit period.

DESCRIPTION OF EMBODIMENTS

Embodiments for carrying out the present disclosure will be described with reference to the accompanying drawings. However, in each drawing, the dimensions and scale of each part are appropriately different from the actual ones. Furthermore, since embodiments described below are preferred specific examples of the present disclosure, various technically preferable limitations are added. However, the scope of the present disclosure is not limited to these forms unless otherwise stated to limit the present disclosure in the following description.

1: First Embodiment

In a first embodiment, a liquid discharge apparatus will be described using, as an example, an ink jet printer that discharges an ink to form an image on recording paper P. Note that, in the first embodiment, the ink is an example of a "liquid" and recording paper P is an example of a "medium." With reference to FIG. 1 to FIG. 9, an ink jet printer 1 according to the first embodiment will be described below.

1-1: Outline of Ink Jet Printer

Figure 1:
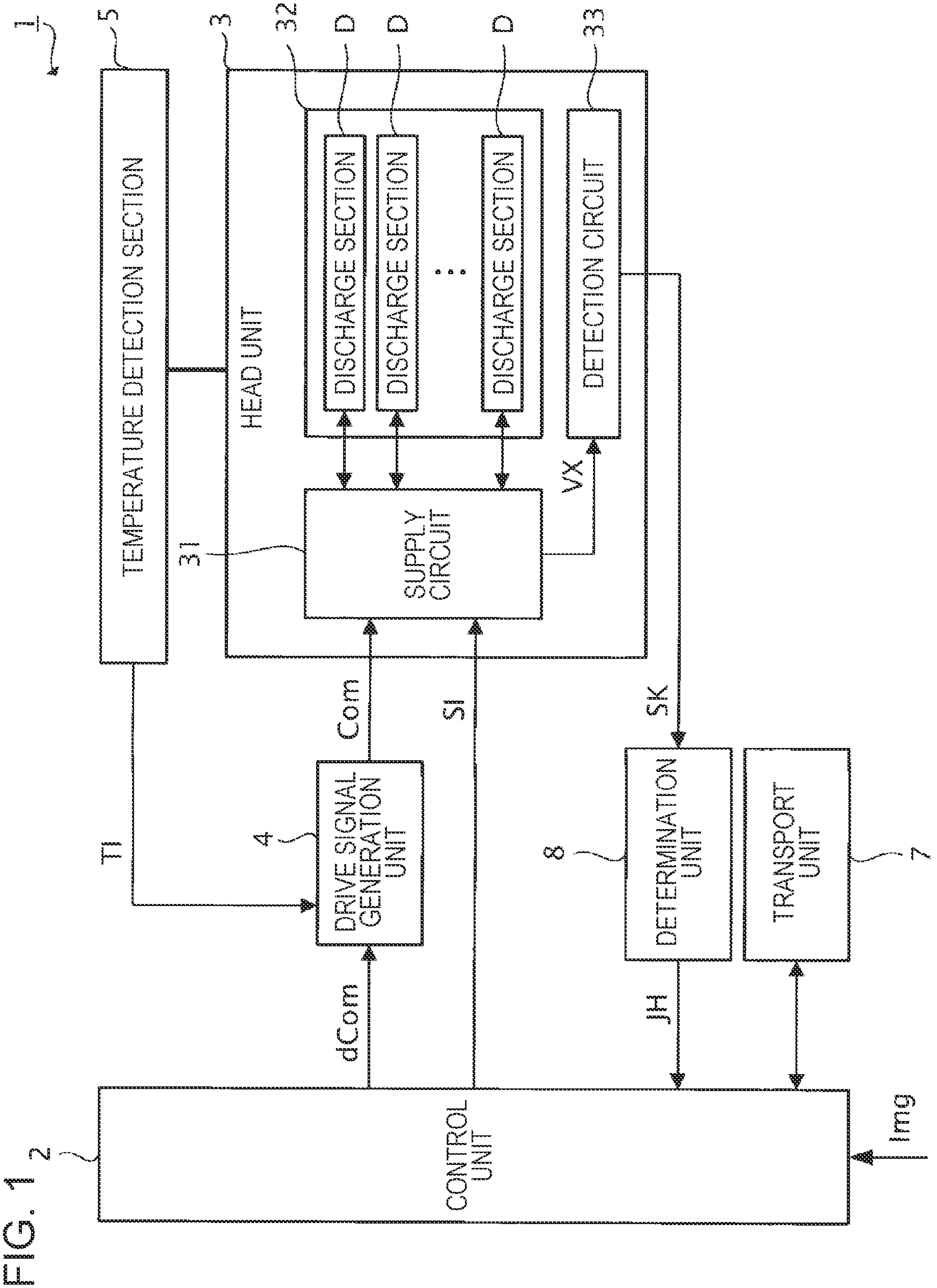
FIG. 1 is a block diagram illustrating an example of a configuration of an ink jet printer according to an embodiment of the present disclosure.

FIG. 1 is a functional block diagram illustrating an example of a configuration of the ink jet printer 1.

As illustrated in FIG. 1, print data Img indicating an image that the ink jet printer 1 is to form is supplied to the ink jet printer 1 from a personal computer or a host computer, such as a digital camera or the like. The ink jet printer 1 executes print processing of forming the image indicated by the print data Img supplied from the host computer on the recording paper P.

As illustrated in FIG. 1, the ink jet printer 1 includes a control unit 2 that controls each component of the ink jet printer 1, a head unit 3 in which a discharge section D that discharges an ink is provided, a drive signal generation unit 4 that generates a drive signal Com that drives the discharge section D, a temperature detection section 5 that detects a temperature of a recording head 32 of the head unit 3, a transport unit 7 that changes a relative position of the recording paper P with respect to the head unit 3, and a determination unit 8 that determines a discharge state of the ink in the discharge section D.

Note that, in this embodiment, a case where the ink jet printer 1 includes one or more head units 3, one or more drive signal generation units 4 corresponding to the one or more head units 3 in a one-to-one manner, and one or more determination units 8 corresponding to the one or more head units 3 in a one-to-one manner is assumed. In the following description, for convenience of description, as illustrated in FIG. 1, a focus is put on one head unit 3 among the one or more head units 3, one drive signal generation unit 4 among the one or more drive signal generation units 4 that is provided to correspond to the one head unit 3, and one determination unit 8 among the one or more determination units 8 that is provided to correspond to the one head unit 3.

The control unit 2 includes one or more central processing units (CPUs). However, the control unit 2 may include, instead of the CPUs or in addition to the CPUs, a programmable logic device, such as a field-programmable gate array (FPGA) or the like. The control unit 2 includes one or both of a volatile memory, such as a random-access memory (RAN) or the like, and a nonvolatile memory, such as a read only memory (ROM), an electrically erasable programmable read-only memory (EEPROM), a programmable ROM (PROM), or the like.

Although details will be described later, the control unit 2 generates signals, such as a print signal SI, a waveform designation signal dCom, or the like, that control respective operations of components of the ink jet printer 1.

Herein, the waveform designation signal dCom is a digital signal that specifies a waveform of the drive signal Com. The driving signal Com is an analog signal that drives the discharge section D. In this embodiment, a case where the driving signals Com include a driving signal Com-A, a driving signal Com-B, and a driving signal Com-C is assumed. The drive signal generation unit 4 includes a DA conversion circuit and generates the driving signal Com having the waveform defined by the waveform designation signal dCom. The print signal SI is a digital signal that designates a type of an operation of the discharge section D. Specifically, the print signal SI is a signal that designates the type of the operation of the discharge section D by designating whether to supply the driving signal Com to the discharge section D. The drive signal generation unit 4 is an example of a "generation section."

As illustrated in FIG. 1, the head unit 3 includes a supply circuit 31, a recording head 32, and a detection circuit 33.

The recording head 32 includes M discharge sections D. Herein, a value M is a natural number that satisfies "M 1." Note that the recording head 32 is an example of a "liquid discharge head." In the following description, among the M discharge sections D provided in the recording head 32, an mth discharge section D will be referred to as a discharge section D[m] sometimes. Herein, a variable m is a natural number that satisfies "1≤m≤M." In the following description, when a component, a signal, or the like of the ink jet printer 1 corresponds to the discharge section D[m] among the M discharge sections D, a subscript [m] is given to a reference symbol that denotes the component, the signal, or the like sometimes.

The supply circuit 31 switches, based on the print signal SI, whether to supply the driving signal Com to the discharge section D[m]. Note that, in the following description, among the driving signals Com, a driving signal Com that is supplied to the discharge section D[m] will be referred to as a supply drive signal Vin[m] sometimes. The supply circuit 31 switches, based on the print signal SI, whether to supply a detection potential signal VX[m] indicating a potential of an upper electrode Zu[m] of a piezoelectric element PZ[m] of the discharge section D[m] to the detection circuit 33.

In the following description, when the detection potential signal VX[m] is supplied from the discharge section D[m] to the detection circuit 33, the discharge section D[m] will be referred to as a determination target discharge section DS sometimes.

Note that the piezoelectric element PZ[m] and the upper electrode Zu[m] will be described later with reference to FIG. 3.

The detection circuit 33 generates a detection signal SK[m], based on the detection potential signal VX[m] supplied from the determination target discharge section DS via the supply circuit 31. Specifically, the detection circuit 33 generates the detection signal SK[m], for example, by amplifying the detection potential signal VX[m] and removing noise components.

The temperature detection section 5 detects the temperature of the recording head 32. The temperature detection section 5 generates a temperature detection signal TI that indicates the detected temperature and supplies the generated temperature detection signal TI to the drive signal generation unit 4.

The determination unit 8 determines, based on the detection signal SK[m], whether a discharge state of an ink in the discharge section D[m] is normal, that is, whether the discharge state is a normal discharge state where a discharge abnormality has not occurred in the discharge section D[m], and generates discharge state determination information JH[m] indicating a result of the determination. Herein, the term "discharge abnormality" is a general term used for expressing a state where the discharge state of the ink in the discharge section D[m] is abnormal, that is, a state where the ink cannot be accurately discharged from a nozzle N of the discharge section D[m]. For example, the term "discharge abnormality" encompasses a state where the ink cannot be discharged from the discharge section D[m], a state where the discharge section D[m] discharges the ink of a different amount from a discharge amount of the ink defined by the driving signal Com, a state where the discharge section D[m] discharges the ink at different speed from discharge speed of the ink defined by the driving signal Com, or the like. Note that, in the following description, processing related to determination of the discharge state of the ink in the discharge section D[m] will be referred to as discharge state determination processing sometimes. That is, the determination target discharge section DS is a discharge section D[m] that is a target of the discharge state determination processing.

In executing print processing, the control unit 2 generates a signal, such as the print signal SI or the like, that controls the head unit 3, based on the image data Img. Furthermore, in executing print processing, the control unit 2 generates a signal, such as the waveform designation signal dCom or the like, that controls the drive signal generation unit 4. Moreover, in executing print processing, the control unit 2 generates a signal that controls the transport unit 7. Thus, in the print processing, the control unit 2 adjusts presence or absence of ink discharge from the discharge section D[m], the discharge amount of the ink, a discharge timing of the ink, or the like and controls each component of the ink jet printer 1 such that the image corresponding to the image data Img is formed on the recording paper P while controlling the transport unit 7 to cause the transport unit 7 to change the relative position of the recording paper P with respect to the head unit 3.

In executing discharge state determination processing, the control unit 2 generates the print signal SI designating that the discharge section D[m] is driven as the determination target discharge section DS and supplies the print signal SI to the supply circuit 31. In this case, the print signal SI designates that the detection potential signal VX[m] is supplied from the discharge section D[m] to the detection circuit 33. Thereafter, in the discharge state determination processing, the detection circuit 33 generates the detection signal SK[m], based on the detection potential signal VX[m] supplied from the discharge section D[m] driven as the determination target discharge section DS via the supply circuit 31. In the discharge state determination processing, the determination unit 8 generates the discharge state determination information JH[m], based on the detection signal Sk[m] supplied from the detection circuit 33.

Figure 2:
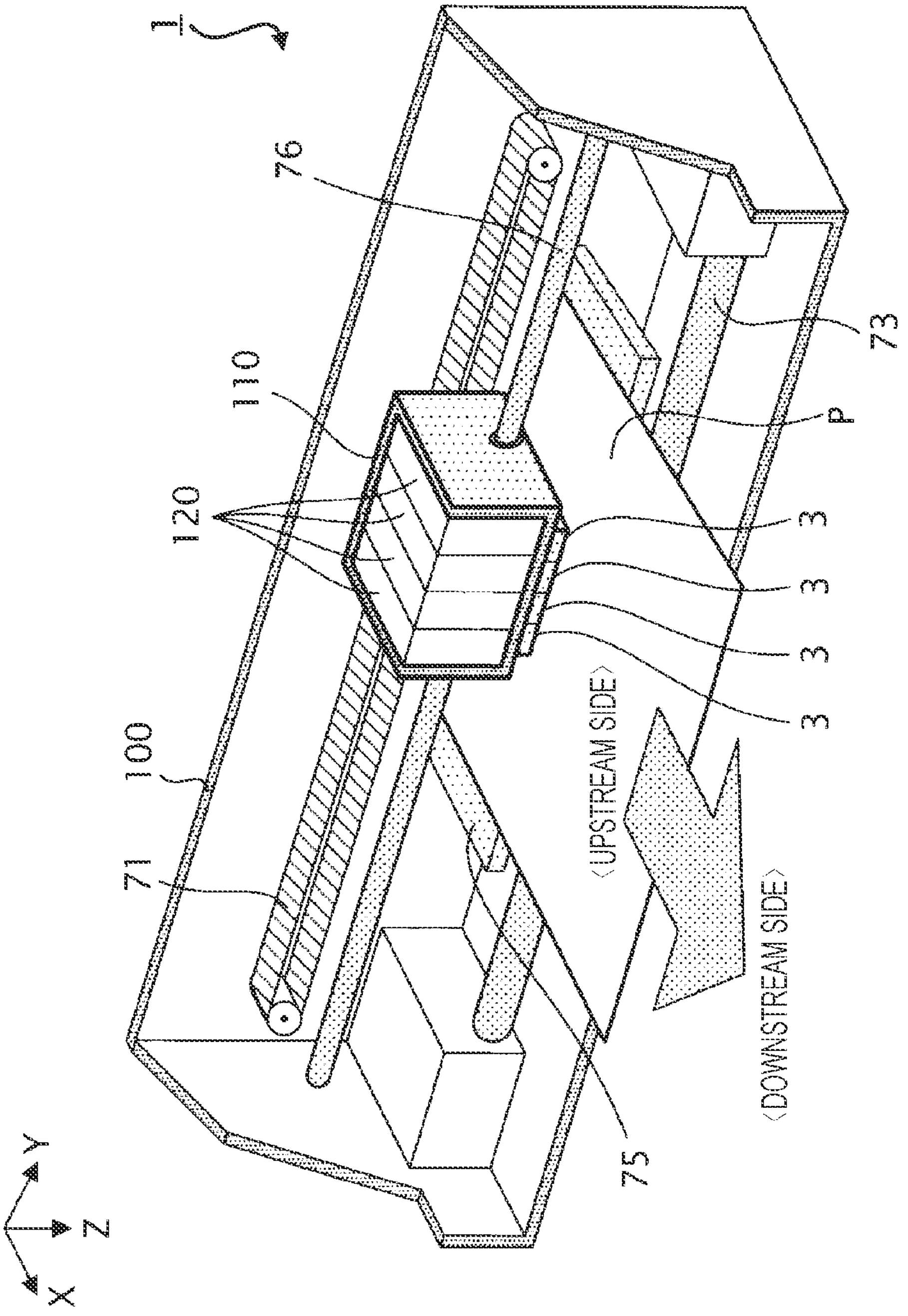
FIG. 2 is a schematic perspective view illustrating an example of an internal structure of the ink jet printer.

FIG. 2 is a schematic perspective view illustrating an example of an internal structure of the ink jet printer 1.

As illustrated in FIG. 2, in this embodiment, a case where the ink jet printer 1 is a serial printer is assumed. Specifically, in executing print processing, the ink jet printer 1 discharges an ink from the discharge section D[m] while transporting the recording paper P in a sub-scanning direction and reciprocating the head unit 3 in a main scanning direction that intersects the sub-scanning direction, and thus, forms dots in accordance with the print data Img on the recording paper P.

Hereinafter, a +X direction and a −X direction that is an opposite direction of the +X direction will be collectively referred to as an "X-axis direction," a +Y direction crossing the X-axis direction and a −Y direction that is the opposite direction of the +Y direction will be collectively referred to as a "Y-axis direction," and a +Z direction crossing the X-axis direction and the Y-axis direction and a −Z direction that is an opposite direction of the +Z direction will be referred to as a "Z-axis direction." In this embodiment, as illustrated in FIG. 2, a direction from a −X side as upstream to a +X side as downstream is the sub-scanning direction and the +X direction and the −Y direction are the main scanning directions. In this embodiment, as illustrated in FIG. 2, the +Z direction corresponds to a discharge direction of the ink from the discharge section D[m].

As illustrated in FIG. 2, the ink jet printer 1 according to this embodiment includes a housing 100 and a carriage 110 that is reciprocatable in the Y-axis direction in the housing 100 and on which the one or more head units 3 are mounted.

In this embodiment, as illustrated in FIG. 2, a case where the carriage 110 stores four ink cartridges 120 corresponding to inks of four colors of cyan, magenta, yellow, and black in a one-to-one manner is assumed. In this embodiment, as an example, a case where the ink jet printer 1 includes four head units 3 corresponding to the four ink cartridges 120 in a one-to-one manner is assumed. Each discharge section D[m]

receives supply of an ink from one of the ink cartridges 120 corresponding to the head unit 3 in which the discharge section D[m] is provided. Thus, each discharge section D[m] can be filled with the supplied ink and can discharge the filled ink from the nozzle N. Note that the ink cartridges 120 may be provided outside the carriage 110. The nozzle N will be described later with reference to FIG. 3.

As described above, the ink jet printer 1 according to this embodiment includes the transport unit 7. As illustrated in FIG. 2, the transport unit 7 includes a carriage transport mechanism 71 that reciprocates the carriage 110 in the Y-axis direction, a carriage guide axis 76 that supports the carriage 110 reciprocatably in the Y-axis direction, a medium transport mechanism 73 that transports the recording paper P, and a platen 75 provided at a +Z side of the carriage 110. Therefore, in executing print processing, the transport unit 7 reciprocates the head units 3 together with the carriage 110 along the carriage guide axis 76 in the Y-axis direction by the carriage transport mechanism 71 and transports the recording paper P in the +X direction on the platen 75 by the medium transport mechanism 73 to change a relative position of the recording paper P with respect to the head units 3 and allow landing of the ink on the entire recording paper P.

Figure 3:
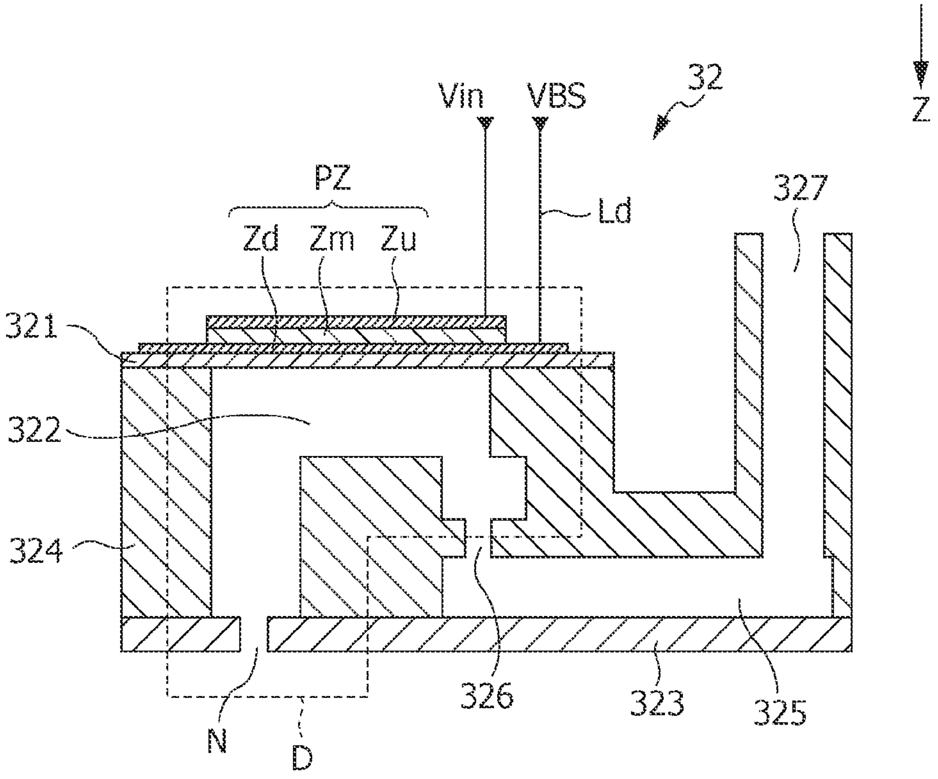
FIG. 3 is a cross-sectional view illustrating an example of a structure of a discharge section.

FIG. 3 is a schematic partial cross-sectional view illustrating of the recording head 32 when the recording head 32 is cut to include the discharge section D[m].

As illustrated in FIG. 3, the discharge section D[m] includes a piezoelectric element PZ[m], a cavity 322 filled with ink inside, a nozzle N that communicates with the cavity 322, and a diaphragm 321. The discharge section D[m] discharges an ink in the cavity 322 from the nozzle N when the piezoelectric element PZ[m] is driven by the supply drive signal Vin[m]. The cavity 322 is a space defined by a cavity plate 324, a nozzle plate 323 on which the nozzles N are formed, and the diaphragm 321. The cavity 322 communicates with a reservoir 325 via an ink supply port 326. The reservoir 325 communicates with the ink cartridge 120 corresponding to the discharge section D[m] via an ink inlet port 327. The piezoelectric element PZ[m] includes an upper electrode Zu[m], a lower electrode Zd[m], and a piezoelectric body Zm[m] provided between the upper electrode Zu[m] and the lower electrode Zd[m]. The lower electrode Zd[m] is electrically connected to a feed line Ld set at a potential VBS. When the supply drive signal Vin[m] is supplied to the upper electrode Zu[m] and a voltage is applied between the upper electrode Zu[m] and the lower electrode Zd[m], the piezoelectric element PZ[m] is displaced in the +Z direction or the −Z direction in accordance with the applied voltage and, as a result, the piezoelectric element PZ[m] vibrates. The lower electrode Zd[m] is bonded to the diaphragm 321. Therefore, when the piezoelectric element PZ[m] is driven by the supply drive signal Vin[m] and vibrates, the diaphragm 321 also vibrates. The vibration of the diaphragm 321 changes a volume of the cavity 322 and a pressure in the cavity 322, and the ink filled in the cavity 322 is discharged from the nozzle N.

Figure 4:
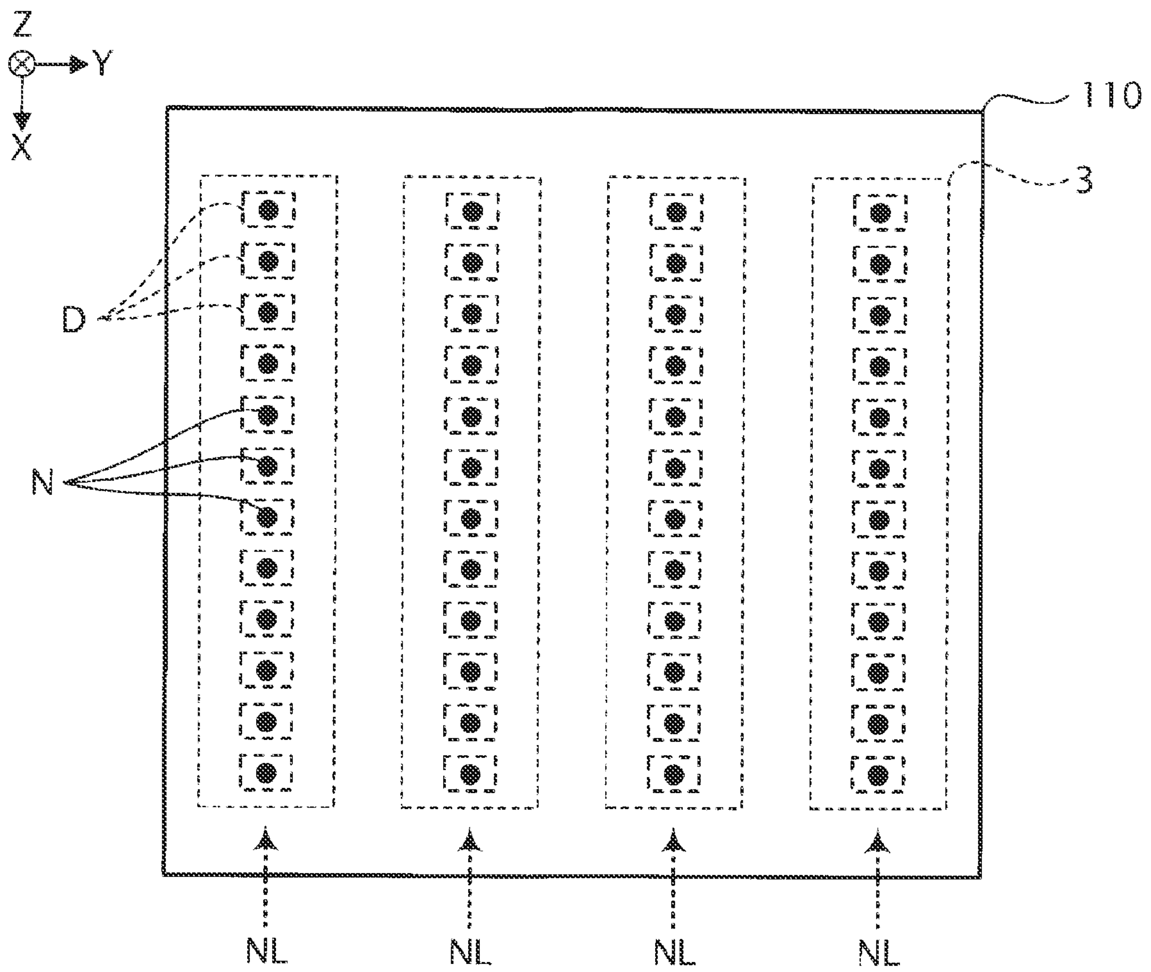
FIG. 4 is a plan view illustrating an example of an arrangement of a nozzle in a head unit.

FIG. 4 is a plan view illustrating an example of an arrangement of the four head units 3 mounted on the carriage 110 and 4M nozzles N in total provided in the four head units 3 when the ink jet printer 1 is viewed from top from the +Z direction.

As illustrated in FIG. 4, nozzle arrays NL are provided in each of the head units 3 provided in the carriage 110. Herein, the nozzle array NL is a plurality of nozzles N provided to extend in a line in a predetermined direction. In this embodiment, a case where each of the nozzle arrays NL includes M nozzles N arranged to extend in the X-axis direction is assumed as an example.

1-2: Configuration of Head Unit

A configuration of the head unit 3 will be described below with reference to FIG. 5.

Figure 5:
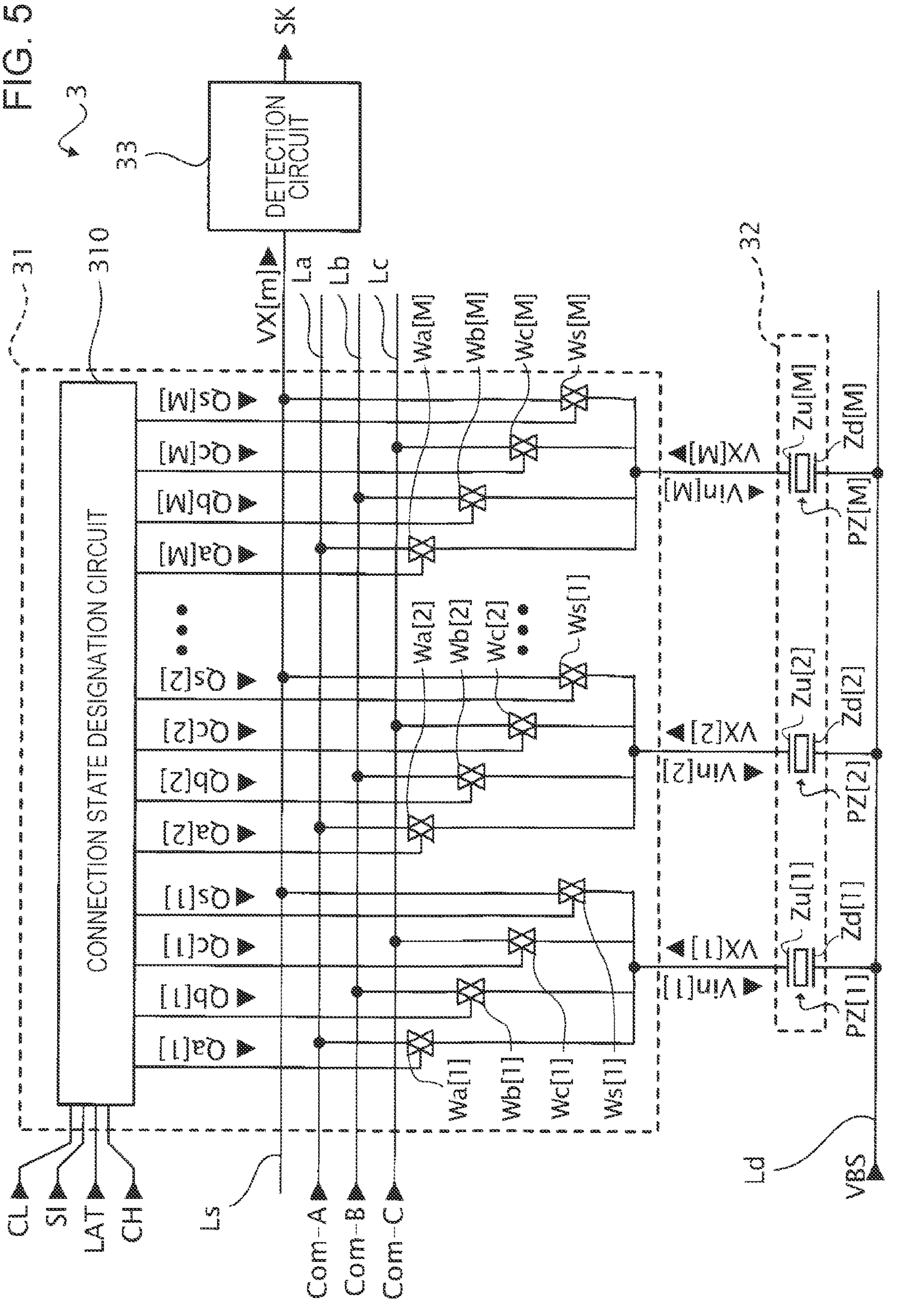
FIG. 5 is a block diagram illustrating an example of a configuration of the head unit.

FIG. 5 is a block diagram illustrating an example of a configuration of the head unit 3.

As illustrated in FIG. 5, the head unit 3 includes the supply circuit 31, the recording head 32, and the detection circuit 33. The head unit 3 also includes a wiring La through which a drive signal Com-A is suppled from the drive signal generation unit 4, a wiring Lb through which a drive signal Com-B is supplied from the drive signal generation unit 4, a wiring Lc through which a drive signal Com-C is supplied from the drive signal generation unit 4, and a wiring Ls through which the detection potential signal VX[m] is supplied to the detection circuit 33.

As illustrated in FIG. 5, the supply circuit 31 includes M switches Wa[1] to Wa[M] corresponding to M discharge sections D[1] to D[M] in a one-to-one manner, M switches Wb[1] to Wb[M] corresponding to the M discharge sections D[1] to D[M] in a one-to-one manner, M switches Wc[1] to Wc[M] corresponding to the M discharge sections D[1]-D[M] in a one-to-one manner, M switches Ws[1] to Ws[M] corresponding to the M discharge sections D[1] to D[M] in a one-to-one manner, and a connection state designation circuit 310 that designates a connection state of each of the switches.

Among these components, the connection state designation circuit 310 generates, based on at least some of a print signal SI, a latch signal LAT, and a change signal CH that are supplied from the control unit 2, a connection state designation signal Qa[m] designating ON and OFF of a switch Wa[m], a connection state designation signal Qb[m] designating ON and OFF of a switch Wb[m], a connection state designation signal Qc[m] designating ON and OFF of a switch Wc[m], and a connection state designation signal Qs[m] designating ON and OFF of the switch Ws[m].

Herein, the switch Wa[m] switches between conduction and non-conduction between the wiring La and the upper electrode Zu[m] of the piezoelectric element PZ[m] provided in the discharge section D[m], based on the connection state designation signal Qa[m]. In this embodiment, the switch Wa[m] is turned on when the connection state designation signal Qa[m] is at a high level and is turned off when the connection state designation signal Qa[m] is at a low level. When the switch Wa[m] is turned on, the drive signal Com-A supplied to the wiring La is supplied to the upper electrode Zu[m] of the discharge section D[m] as the supply drive signal Vin[m].

The switch Wb[m] switches between conduction and non-conduction between the wiring Lb and the upper electrode Zu[m] of the piezoelectric element PZ[m] provided in the discharge section D[m], based on the connection state designation signal Qb[m]. In this embodiment, the switch Wb[m] is turned on when the connection state designation signal Qb[m] is at a high level and is turned off when the connection state designation signal Qb[m] is at a low level. When the switch Wb[m] is turned on, the drive signal Com-B supplied to the wiring Lb is supplied to the upper electrode Zu[m] of the discharge section D[m] as the supply drive signal Vin[m].

The switch Wc[m] switches between conduction and non-conduction between the wiring Lc and the upper electrode Zu[m] of the piezoelectric element PZ[m] provided in the discharge section D[m], based on the connection state designation signal Qc[m]. In this embodiment, the switch Wc[m] is turned on when the connection state designation signal Qc[m] is at a high level and is turned off when the connection state designation signal Qc[m] is at a low level. When the switch Wc[m] is turned on, the drive signal Com-C supplied to the wiring Lc is supplied to the upper electrode Zu[m] of the discharge section D[m] as the supply drive signal Vin[m].

The switch Ws[m] switches between conduction and non-conduction between the wiring Ls and the upper electrode Zu[m] of the piezoelectric element PZ[m] provided in the discharge section D[m], based on the connection state designation signal Qs[m]. In this embodiment, the switch Ws[m] is turned on when the connection state designation signal Qs[m] is at a high level and is turned off when the connection state designation signal Qs[m] is at a low level. When the switch Ws[m] is turned on, a potential of the upper electrode Zu[m] of the discharge section D[m] is supplied to the detection circuit 33 via the wiring Ls as the detection potential signal VX[m].

The detection circuit 33 generates, based on the detection potential signal VX[m] supplied from the wiring Ls, a detection signal SK[m] having a waveform corresponding to a waveform of the detection potential signal VX[m].

1-3: Operation of Head Unit

An operation of the head unit 3 will be described below with reference to FIG. 6 to FIG. 9.

In this embodiment, when the ink jet printer 1 executes discharge state determination processing, one or more unit periods TP are set as an operation period of the ink jet printer 1. In each unit period TP, the ink jet printer 1 according to this embodiment can drive each of the discharge sections D[m] for the discharge state determination processing. That is, the ink jet printer 1 according to this embodiment can drive each of the discharge sections D[m] for the discharge state determination processing in each of the one or more unit periods TP repeatedly set in the operation period of the ink jet printer 1. Note that the unit period TP is an example of a “drive cycle.”

Figure 6:
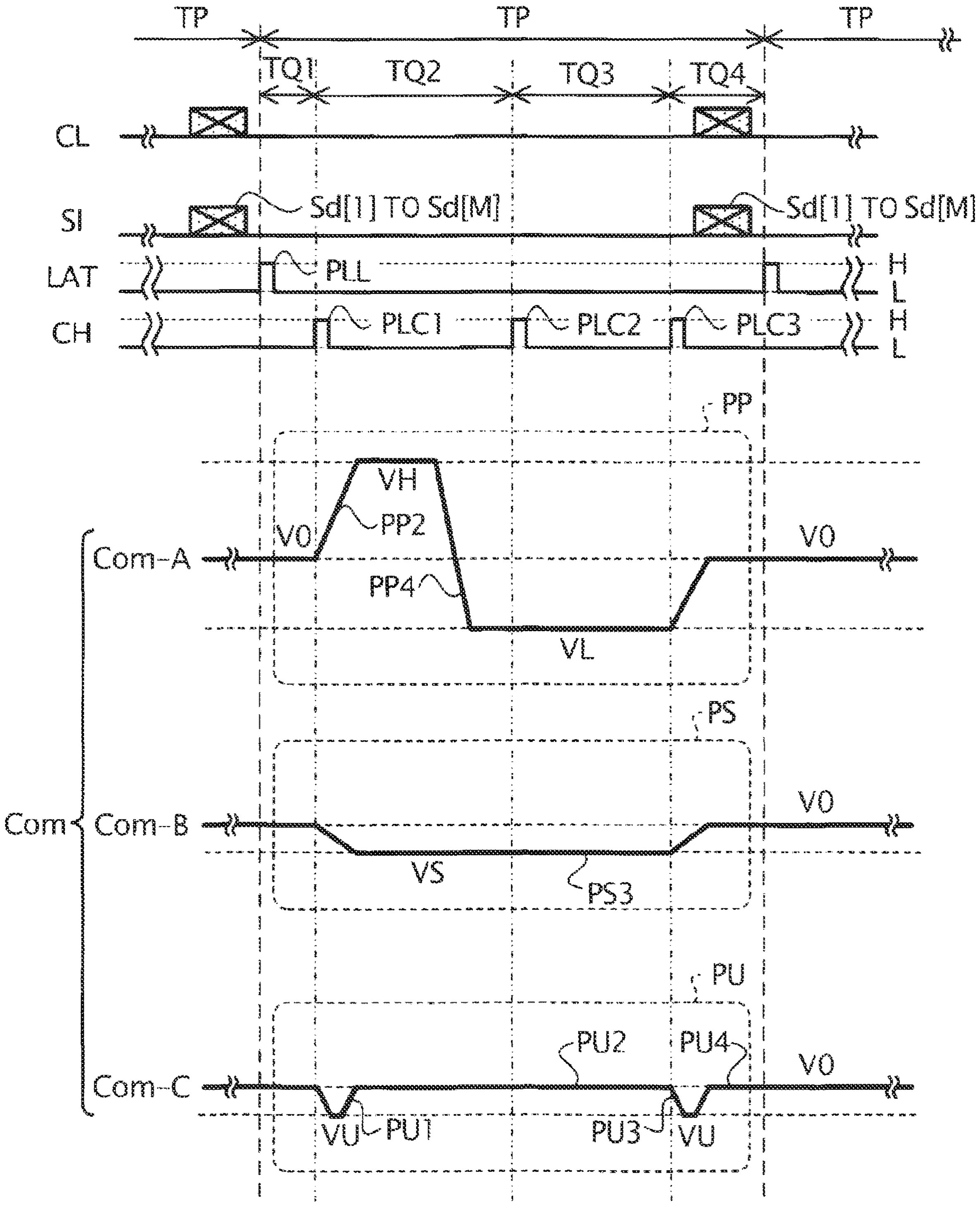
FIG. 6 is an example timing chart illustrating an operation of the ink jet printer when discharge state determination is performed in a unit period.
Figure 7:
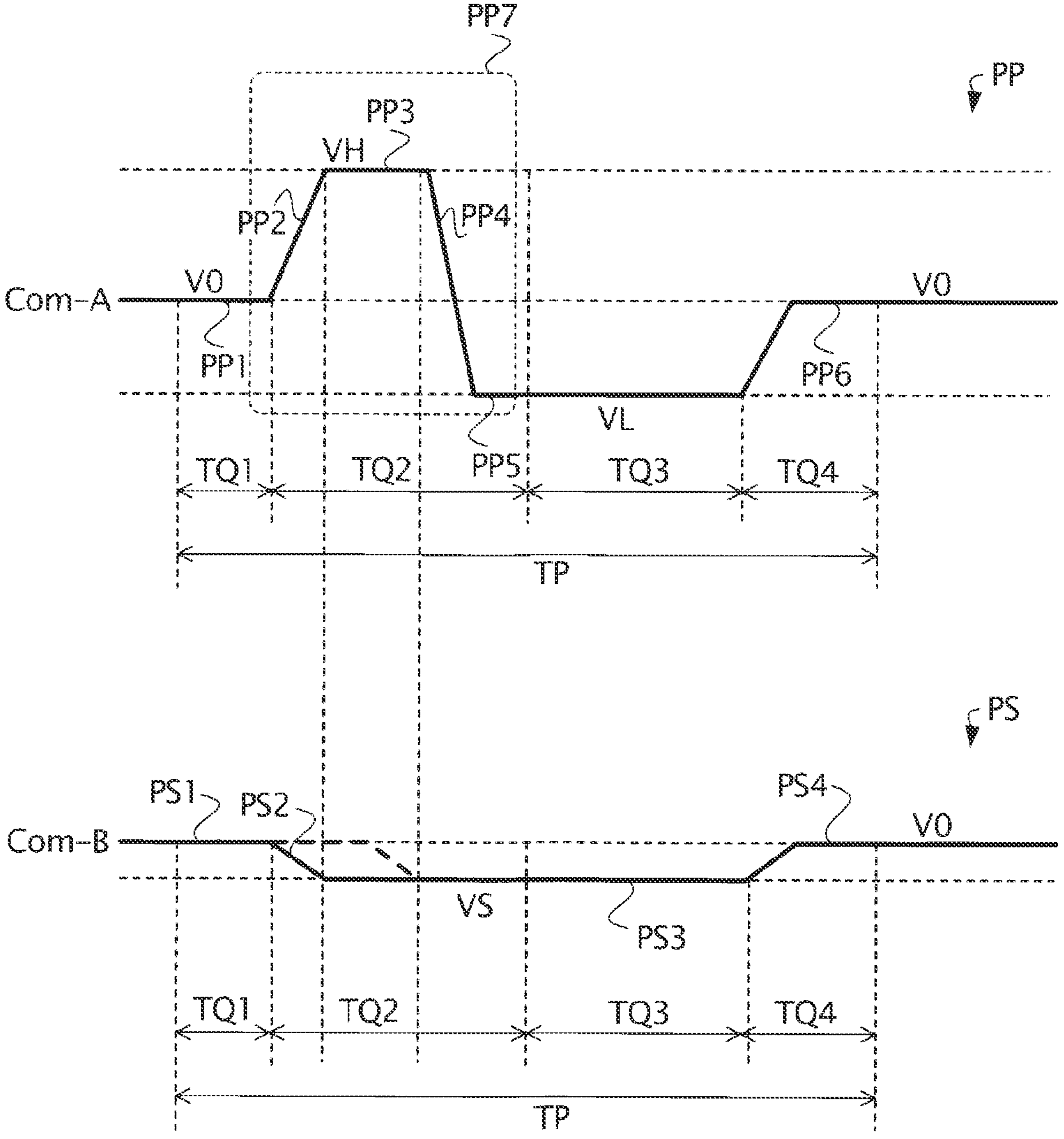
FIG. 7 is an example timing chart illustrating drive signals in the unit period.

FIG. 6 is an example of a timing chart illustrating an operation of the ink jet printer 1 during discharge state determination in the unit period TP. FIG. 7 is also an example of a timing chart illustrating the drive signal Com-A and the drive signal Com-B in the unit period TP.

As illustrated in FIG. 6, the control unit 2 outputs the latch signal LAT having a pulse PLL. Thus, the control unit 2 defines the unit period TP as a period from a rising edge of the pulse PLL to a rising edge of a next pulse PLL.

In the unit period TP, the control unit 2 outputs the change signal CH having a pulse PLC. The control unit 2 divides the unit period TP into a control period TQ1 from a rising edge of a pulse PLL to a rising edge of a pulse PLC1, a control period TQ2 from the rising edge of the pulse PLC1 to a rising edge of a pulse PLC2, a control period TQ3 from the rising edge of the pulse PLC2 to a rising edge of a pulse PLC3, and a control period TQ4 from the rising edge of the pulse PLC3 to a rising edge of a pulse PLL. The control period TQ1 is an example of a “start period.” The control period TQ2 is an example of a “first period.” The control period TQ3 is an example of a “second period.” The control period TQ4 is an example of an “end Period.”

The print signal SI according to this embodiment includes M individual designation signals Sd[1] to Sd[M] corresponding to the M discharge sections D[1] to D[M] in a one-to-one manner. An individual designation signal Sd[m] designates a mode of driving of the discharge section D[m] in each unit period TP when the ink jet printer 1 executes the discharge state determination processing.

As illustrated in FIG. 6, prior to each unit period TP, the control unit 2 supplies the print signal SI including the individual designation signals Sd[1] to Sd[M] to the connection state designation circuit 310 in synchronization with the clock signal CL. The connection state designation circuit 310 generates the connection state designation signal Qa[m], the connection state designation signal Qb[m], the connection state designation signal Qc[m], and the connection state designation signal Qs[m], based on the individual designation signal Sd[m] in the corresponding unit period TP.

Note that, in this embodiment, a case where, in the unit period TP, an individual designation signal Sd[m] can take any one of three values, that is, a value “1” designating the discharge section D[m] as the determination target discharge section DS, a value “2” designating the discharge section D[m] as a neighboring discharge section DK adjacent to the determination target discharge section DS, and a value “3” designating the discharge section D[m] as a normal discharge section DT that is some other discharge section than the determination target discharge section DS and the neighboring discharge section DK, is assumed. In other words, a case where the control unit 2 designates one discharge section D among the M discharge sections D[1] to D[M] as the determination target discharge section DS, designates, as the neighboring discharge sections DK, some of other discharge sections D than the discharge section D designated as the determination target discharge section DS, and designates, as the normal discharge section DT, other discharge sections D than the discharge sections D designated as the determination target discharge sections DS and the neighboring section DK is assumed. Note that a relationship in which the neighboring discharge section DK is “adjacent” to the determination target discharge section DS may be, for example, a relationship in which a pressure chamber provided in the determination target discharge section DS and a pressure chamber provided in the neighboring discharge DK are adjacent to each other with a partition wall provided therebetween and may be, for example, a relationship in which one discharge section that is closest to the one determination target discharge section DS among the M discharge sections D is the neighboring discharge section DK. Note that the target discharge section DS is an example of a “first discharge section.” The neighboring discharge section DK is an example of a “second discharge section.” The normal discharge section DT is an example of a “third discharge section.” The normal discharge section DT is located more distant from the determination target discharge section DS than the neighboring discharge section DK. In the determination target discharge section DS, pressure fluctuation occurs in the liquid in the cavity 322 of the determination target discharge section DS in accordance with displacement of the piezoelectric element PZ[m] of the determination target discharge section DS. The piezoelectric element PZ[m] of the determination target discharge section DS is an example of a “first piezoelectric element.” The cavity 322 of the determination target discharge section DS is an example of a “first pressure chamber.” In the neighboring discharge section DK, pressure fluctuation occurs in the liquid in the cavity 322 of the neighboring discharge section DK in accordance with the displacement of the piezoelectric element PZ[m] of the neighboring discharge section DK. The piezoelectric element PZ[m] of the neighboring discharge section DK is an example of a "second piezoelectric element." The cavity 322 of the neighboring discharge section DK is an example of a "second pressure chamber."

As illustrated in FIG. 6, in this embodiment, the drive signal Com-A has a waveform PP provided in the unit period TP. Herein, the waveform PP is a waveform that maintains a reference potential V0 in the control period TQ1, changes from the reference potential V0 to a potential VH and then to a potential VL in the control period TQ2, maintains the potential VL in the control period TQ3, and changes from the potential VL to the reference potential V0 in the control period TQ4. Note that, in the present disclosure, the phrase "one signal maintains one potential in one period" expresses a concept including not only a case where "one signal maintains a potential that matches one potential in one period" but also a case where "one signal maintains a potential that matches one potential in one period in designing" and a case where "when noise is eliminated, one signal can be considered to maintain a potential that matches one potential in one period."

In this embodiment, the potential VH is a potential higher than the reference potential V0. The potential VH is an example of a "second potential." However, the potential VH may be equal to the reference potential V0. In this embodiment, the potential VL is lower than the reference potential V0. However, the potential VL may be lower than the potential VH.

Note that, in this embodiment, as an example, a case where, when a potential of the supply drive signal Vin[m] is a high potential, a volume of a cavity 322[*m*] corresponding to the discharge section D[m] is smaller than that when the potential is a low potential. That is, in this embodiment, when the potential of the supply drive signal Vin[m] changes from a low potential to a high potential, an ink can be discharged from the cavity 322[*m*] corresponding to the discharge section D[m].

As illustrated in FIG. 7, a portion of the waveform PP that maintains the reference potential V0 in the control period TQ1 will be hereinafter referred to as a waveform PP1. The waveform PP1 is an example of a "third reference potential maintaining element." A portion of the waveform PP that changes from the reference potential V0 to the potential VH in the control period TQ2 will be referred to as a waveform PP2. The waveform PP2 is an example of a "third potential changing element." A portion of the waveform PP that maintains the potential VH in the control period TQ2 will be referred to as a waveform PP3. The waveform PP3 is an example of a "third potential maintaining element." A portion of the waveform PP that changes from the potential VH to the potential VL in the control period TQ2 will be referred to as a waveform PP4. The waveform PP4 is an example of a "first potential changing element." A portion of the waveform PP that maintains the potential VL in the control period TQ2 will be referred to as a waveform PP5. The waveform PP5 is an example of a "second potential maintaining element." A portion of the waveform PP that maintains the reference potential V0 in the control period TQ4 will be referred to as a waveform PP6. The waveform PP6 is an example of a "fourth reference potential maintaining element." A waveform PP7 that is a total of the waveform PP2, the waveform PP3, and the waveform PP4 is an example of a "first drive pulse." The waveform PP7 as the "first drive pulse" displaces the piezoelectric element PZ[m] in the control period TQ2. In this embodiment, the waveform PP2 is a waveform that displaces the piezoelectric element PZ[m] in the +Z direction, and the waveform PP4 is a waveform that displaces the piezoelectric element PZ[m] in the −Z direction.

As illustrated in FIG. 6, in this embodiment, the drive signal Com-B has a waveform PS provided in the unit period TP. Herein, the waveform PS maintains the reference potential V0 in the control period TQ1, changes from the reference potential V0 to a potential VS in the control period TQ2, maintains the potential VS in the control period TQ3, and changes from the potential VS to the reference potential V0 in the control period TQ4.

In this embodiment, the potential VS is lower than the reference potential V0. As will be described below, the drive signal generation unit 4 corrects the reference potential V0, based on a temperature indicated by the temperature detection signal TI. The potential VS is lower than the corrected reference potential V0. For example, it is preferable that the potential VS is lower than the reference potential V0 at a lowest temperature in a recommended environment in which the ink jet printer 1 is used. Alternatively, for example, the potential VS may be lower than the reference potential V0 at an average temperature in the recommended environment in which the ink jet printer 1 is used. The potential VS is an example of a "first potential." Note that the drive signal Com-B is an example of a "second drive signal."

As illustrated in FIG. 7, a portion of the waveform PS that maintains the reference potential V0 in the control period TQ1 will be hereinafter referred to as a waveform PS1. The waveform PS1 is an example of a "first reference potential maintaining element." A portion of the waveform PS that changes from the reference potential V0 to the potential VS in the control period TQ2 will be referred to as a waveform PS2. The waveform PS2 is an example of a "second potential changing element." A portion of the waveform PS that maintains the potential VS in the control period TQ3 will be referred to as a waveform PS3. The waveform PS3 is an example of a "first potential maintaining element." In this embodiment, the waveform PS3 is a waveform that allows a displacement state of the piezoelectric element PZ[m] to be maintained. A portion of the waveform PS that maintains the reference potential V0 in the control period TQ4 will be referred to as a waveform PS4. The waveform PS4 is an example of a "second reference potential maintaining element."

Note that the waveform PS2 may be a waveform that changes from the reference potential V0 to the potential VS from a start point of the control period TQ2 to a time point corresponding to a start point of the waveform PP4. Alternatively, the waveform PS2 may be a waveform that changes from the reference potential V0 to the potential VS from the start point of the control period TQ2 to a time point corresponding to a start point of the waveform PP3.

As illustrated in FIG. 6, in this embodiment, the drive signal Com-C has a waveform PU provided in the unit period TP. Herein, the waveform PU maintains the reference potential V0 in the control period TQ1. In the control period TQ2, the waveform PU changes from the reference potential V0 to a potential VU that is lower than the reference potential V0, changes, after maintaining the potential VU, from the potential VU to the reference potential V0, and maintains, after changing to the reference potential V0, the reference potential V0. The waveform PU maintains the reference potential V0 in the control period TQ3. In the control period TQ4, the waveform PU changes from the reference potential V0 to the potential VU, changes, after maintaining the potential VU, from the potential VU to the reference potential V0, and maintains, after changing to the reference potential V0, the reference potential V0. Hereinafter, a portion of the waveform PU that changes from the reference potential V0 to the potential VU and changes, after maintaining the potential VU, from the potential VU to the reference potential V0 in the control period TQ2 will be referred to as a waveform PU1. A portion of the waveform PU that maintains the reference potential V0 in the control period TQ3 will be referred to as a waveform PU2. A portion of the waveform PU that changes from the reference potential V0 to the potential VU and changes, after maintaining the potential VU, from the potential VU to the reference potential V0 in the control period TQ4 will be referred to as a waveform PU3. In this embodiment, the waveform PU1 and the waveform PU3 are waveforms that cause the piezoelectric element PZ[m] to micro-vibrate. More specifically, the waveform PU1 and the waveform PU3 are waveforms that drive the piezoelectric element PZ[m] such that pressure fluctuation is caused in the liquid in the cavity 322 to an extent in which the liquid is not discharged from the nozzle N. Note that the waveform PU1 and the waveform PU3 are examples of a “second drive pulse.”

Note that the waveform PU may include only one of the waveform PU1 and the waveform PU3. The waveform PU1 may be included in the waveform PU in a period earlier than the control period TQ3 in the unit period TP. The waveform PU3 may be included in the waveform PU in a period later than the control period TQ3 in the unit time TP. That is, the waveforms PU1 and PU3 may be included in the waveform PU in some other period than the control period TQ3 in the unit period TP.

The drive signal generation unit 4 corrects the reference potential V0, based on the temperature indicated by the temperature detection signal TI. On the other hand, the drive signal generation unit 4 maintains the potential VS in the control period TQ3 at a constant potential, regardless of the temperature indicated by the temperature detection signal TI.

The drive signal generation unit 4 maintains a shape of the waveform PP7 as the first drive pulse, regardless of the temperature indicated by the temperature detection signal TI. The drive signal generation unit 4 may be configured to maintain the potential VH and the potential VL at a constant potential, regardless of the temperature indicated by the temperature detection signal TI.

Moreover, the drive signal generation unit 4 corrects the waveform of the second drive pulse, that is, the waveform PU1 and the waveform PU3, based on the temperature indicated by the temperature detection signal TI.

Figures 8, 9:
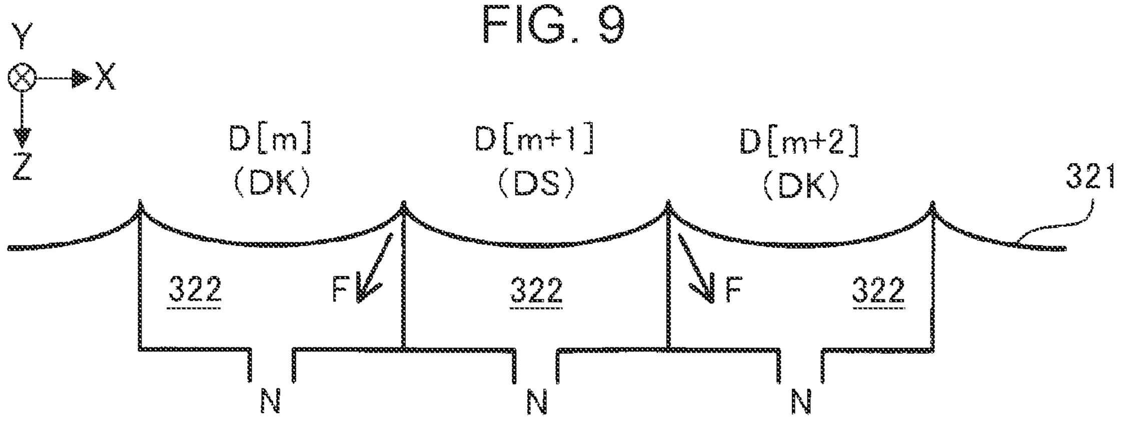
FIG. 8 is a table illustrating a relationship between an individual designation signal and connection state designation signals in the unit period.
FIG. 9 is a schematic partial cross-sectional view of a nozzle array.

FIG. 8 is a table illustrating a relationship between the individual designation signal Sd[m], the connection state designation signal Qa[m], the connection state designation signal Qb[m], the connection state designation signal Qc[m], and the connection state designation signal Qs[m] in the unit period TP.

As illustrated in FIG. 8, when the individual designation signal Sd[m] is the value “1” designating the discharge section D[m] as the determination target discharge section DS in the unit period TP, the connection state designation circuit 310 sets the connection state designation signal Qa[m] to a high level in the control period TQ1, the control period TQ2, and the control period TQ4, and sets the connection state designation signal Qs[m] to a high level in the control period TQ3. In this case, the switch Wa[m] is turned on in the control period TQ1, the control period TQ2, and the control period TQ4, and the switch Ws[m] is turned on in the control period TQ3. Therefore, when vibration occurs in the discharge section D[m] as a result of driving of the discharge section D[m] designated as the determination target discharge section DS by the supply drive signal Vin[m] having the waveform PP2 and the waveform PP4 in the control period TQ2, the vibration remains also in the control period TQ3. In the control period TQ3, when the vibration remains in the discharge section D[m], the potential of the upper electrode Zu[m] provided in the discharge section D[m] changes. In the control period TQ3, when the vibration remains in the discharge section D[m], the potential of the upper electrode Zu[m] is supplied to the detection circuit 33 as the detection potential signal VX[m] via the switch Ws[m].

That is, the waveform of the detection potential signal VX[m] detected from the discharge section D[m] set as the determination target discharge section DS in the control period TQ3 exhibits a waveform of the vibration remaining in the discharge section D[m] in the control period TQ3 after driving of the supply drive signal Vin[m] in the control period TQ2. Then, the waveform of the detection signal SK[m] generated based on the detection potential signal VX[m] detected from the discharge section D[m] in the control period TQ3 exhibits the waveform of the vibration remaining in the discharge section D[m] in the control period TQ3. The detection circuit 33 is an example of a “vibration detection section.”

When the individual designation signal Sd[m] is the value “2” designating the discharge section D[m] as the neighboring discharge section DK in the unit period TP, the connection state designation circuit 310 sets the connection state designation signal Qb[m] to a high level in the control period TQ1, the control period TQ2, the control period TQ3, and the control period TQ4. In this case, the switch Wb[m] is turned on in the control period TQ1, the control period TQ2, the control period TQ3, and the control period TQ4.

Herein, a relationship between the determination target discharge section DS and the neighboring discharge section DK will be described. A plurality of discharge sections D in a nozzle array NL are continuously arranged with a partition wall provided between adjacent ones thereof. FIG. 9 is a schematic partial cross-sectional view illustrating the plurality of discharge sections D in the nozzle array NL that are arranged with a partitioning wall provided between adjacent ones of the discharge sections D. Note that, in each of the discharge sections D, the piezoelectric element PZ is provided on the diaphragm 321, but illustration thereof is omitted in FIG. 9. The piezoelectric element PZ[m] is displaced depending on the potential of the supply drive signal Vin[m], and the diaphragm 321 is distorted accordingly. Since the diaphragm 321 is continuously provided in a plurality of discharge sections D, portions of the diaphragm 321 that correspond to the discharge sections D that are continuously arranged pull the diaphragm 321 itself in accordance with respective distortions thereof. As illustrated in FIG. 9, a portion of the diaphragm 321 that corresponds to a discharge section D[m+1] is pulled by a force F that corresponds to deflection of portions of the diaphragm 321 that correspond to the discharge section D[m] and a discharge section D[m+2]. For example, when the discharge section D[m+1] is set as the determination target discharge section DS and the discharge section D[m] and the discharge section D[m+2] are set as the neighboring discharge sections DK, a magnitude of tension of the portion of the diaphragm 321 that corresponds to the determination target discharge section DS changes depending on a magnitude of distortion of the portion of the diaphragm 321 that corresponds to the neighboring discharge section DK. That is, the tension of the portion of the diaphragm 321 that corresponds to the determination target discharge section DS changes in accordance with change of a state of the distortion of the portion of the diaphragm 321 that corresponds to the neighboring discharge section DK, so that the distortion of the portion of the diaphragm 321 that corresponds to the neighboring discharge section DK affects a waveform of vibration remaining in the determination target discharge section DS in the control period TQ3.

In this embodiment, as a result of driving of the discharge section D[m] designated as the neighboring discharge section DK by the supply drive signal Vin[m] having the waveform PS3 in the control period TQ3, vibration does not occur in the discharge section D[m] and the waveform of the vibration remaining in the determination target discharge section DS is not affected.

In the ink jet printer 1, an appropriate reference potential V0 is changed by correcting the drive signal Com, based on the temperature detection signal TI, in order to suppress reduction of print quality resulted from change of a weight and a flying speed of ink drops discharged from the nozzles N due to change of characteristics of an ink depending on a temperature. Since, among a plurality of drive signals Com, a drive signal Com that is conducted to the upper electrode Zu[m] of the piezoelectric element PZ[m] provided in the discharge section D[m] can be switched in printing processing and discharge state determination processing, the reference potential V0 is set equally for the plurality of drive signals Com, and sudden change of a potential supplied to the upper electrode Zu[m] when the drive signal Com is switched is suppressed. At that time, when the potential VS is changed in accordance with the change of the reference potential V0 while a shape of the waveform PS of the drive signal Com-B is maintained, the distortion state of the portion of the diaphragm 321 that corresponds to the discharge section D[m] designated as the neighbor discharge section DK changes in accordance with the temperature, and the waveform of the vibration remaining in the determination target discharge section DS in the control period TQ3 is affected.

In this embodiment, regardless of the temperature indicated by the temperature detection signal TI, the drive signal generation unit 4 maintains the potential VS in the control period TQ3 at a constant potential, so that an amount of the distortion of the neighboring discharge section DK does not change depending on the temperature and the waveform of the vibration remaining in the determination target discharge section DS is not affected.

When the individual designation signal Sd[m] is the value "3" designating the discharge section D[m] as the normal discharge section DT in the unit period TP, the connection state designation circuit 310 sets the connection state signal Qc[m] to a high level in the control period TQ1, the control period TQ2, the control period TQ3, and the control period TQ4. In this case, the switch Wc[m] is turned on in the control period TQ1, the control period TQ2, the control period TQ3, and the control period TQ4. Therefore, as a result of driving of the discharge section D[m] designated as the normal discharge section DT by the supply drive signal Vin[m] having the waveform PU1 in the control period TQ2 and the waveform PU3 in the control period TQ4, micro vibration occurs in the discharge section D[m]. As the normal discharge section DT of this embodiment, the discharge section D[m] located in a position where the tension of the portion of the diaphragm 321 that corresponds to the determination target discharge section DS is not affected can be designated. By causing micro vibration in the discharge section D[m] in the control period TQ2 and the control period TQ4 that are different from the control period TQ3 in which the detection potential signal VX[m] is detected, reduction of accuracy of determination on whether the discharge state of the ink in the determination target discharge section DS is abnormal can be suppressed while thickening of the liquid in the cavity 322 of the discharge section D[m] is suppressed.

1-4: Effects of First Embodiment

As described above, the ink jet printer 1 according to this embodiment includes the recording head 32 as the liquid discharge head including the plurality of discharge sections D, the drive signal generation unit 4 as the generation section, the detection circuit 33 as the vibration detection section, and the temperature detection section 5.

The plurality of discharge sections D include the first discharge section that discharges the liquid in the cavity 322 as the first pressure chamber in accordance with displacement of the piezoelectric element PZ[m] as the first piezoelectric element and the second discharge section that discharges the liquid in the cavity 322 as the second pressure chamber in accordance with displacement of the piezoelectric element PZ[m] as the second piezoelectric element. The drive signal generation unit 4 generates the first drive signal Com-A that displaces the piezoelectric element PZ[m] as the first piezoelectric element of the first discharge section set as the determination target discharge section DS and the second drive signal Com-B that displaces the piezoelectric element as the second piezoelectric element of the second discharge section set as the neighboring discharge section DK. The detection circuit 33 detects remaining vibration that occurs in the determination target discharge section DS after the drive signal Com-A is supplied to the piezoelectric element PZ[m] as the first piezoelectric element. The temperature detection section 5 detects the temperature of the recording head 32. The drive signal Com-A has the waveform PP7 as the first drive pulse in the control period TQ2 as the first period in the drive cycle. The drive signal Com-B has the waveform PS1 as the first reference potential maintaining element, the waveform PS3 as the first potential remaining element, and the waveform PS4 as the second reference potential maintaining element. The waveform PS1 maintains the reference potential V0 in the control period TQ1 as a first start period including a start point of the drive cycle. The waveform PS3 maintains the potential VS as the first potential in the control period TQ3 as the second period following the control period TQ2. The waveform PS4 maintains the reference potential V0 in the control period TQ4 as the first end period that starts after the control period TQ3 ends and includes an end point of the drive cycle. The detection circuit 33 detects the remaining vibration that occurs in the determination target discharge section DS in the control period TQ3. The drive signal generation unit 4 corrects the reference potential V0, based on the temperature detected by the temperature detection section 5. The drive signal generation unit 4 maintains the potential VS at a constant potential, regardless of the temperature detected by the temperature detection section 5.

As described above, the ink jet printer 1 according to this embodiment is configured such that, in the control period TQ3 in which the remaining vibration that occurs in the determination target discharge section DS is detected, the potential VS of the second drive signal Com-B that displaces the piezoelectric element PZ[m] of the neighboring discharge section DK is maintained at a constant potential, regardless of the environmental temperature. Accordingly, in this embodiment, displacement of the piezoelectric element PZ[m] of the neighboring discharge section DK due to change of the environmental temperature can be suppressed. As a result, in this embodiment, fluctuation of characteristics of the remaining vibration that occurs in the determination target discharge section DS can be suppressed. Therefore, in this embodiment, even when the environmental temperature fluctuates, the discharge state of the ink can be accurately determined based on the remaining vibration that occurs in the determination target discharge section DS.

In the ink jet printer 1 according to this embodiment, the drive signal generation unit 4 maintains the shape of the waveform PP7 as the first drive pulse, regardless of the temperature detected by the temperature detection section 5.

Therefore, the ink jet printer 1 can apply a certain potential to the piezoelectric element PZ[m], regardless of the environmental temperature when applying vibration to the determination target discharge section DS.

In the ink jet printer 1 according to this embodiment, the drive signal Com-A as the first drive signal has the waveform PP1 as the third reference potential maintaining element that maintains the reference potential V0 in a second start period including a start point of the drive cycle and the waveform PP6 as the fourth reference potential maintaining element that maintains the reference potential V0 in a second end period that starts after an end of the control period TQ3 as the second period and includes an end point of the drive cycle.

Therefore, in switching the drive signal Com that is given to the piezoelectric element PZ[m] between the drive signal Com-A, the c drive signal Com-B, and the drive signal Com-C, the connection state designation circuit 310 can perform switching in a seamless manner with the reference potential V0 given therebetween.

In the ink jet printer 1 according to this embodiment, the waveform PP7 as the first drive pulse includes the waveform PP4 as the first potential changing element in which the potential changes. The drive signal Com-A as the first drive signal has the waveform PP5 as the second potential maintaining element that maintains the potential VL at a terminal end of the waveform PP4 in a period from a time point corresponding to the terminal end of the waveform PP4 to a start point of the control period TQ3 as the second period. The drive signal Com-B as the second drive signal has the waveform PS2 as the second potential changing element in which the potential changes from the reference potential V0 to the potential VS as the first potential from the start point of the control period TQ2 as the first period to a time point corresponding to the start point of the waveform PP4.

Therefore, in the first period, as compared to a case where a time point of generation of the waveform PS2 is included in a period in which the waveform PP4 and the waveform PP5 are generated, an influence of application of the vibration of the neighboring discharge section DK due to Com-B as the second drive signal to the determination target discharge section DS can be reduced.

In the ink jet printer 1 according to this embodiment, the waveform PP7 of the first drive pulse includes the waveform PP2 as the third potential changing element that changes from the reference potential V0 to the potential VH and the waveform PP3 as the third potential maintaining element that maintains the potential VH of the waveform PP2 from a time point corresponding to a terminal end of the waveform PP2. A terminal end of the waveform PP3 is the start point of the waveform PP4 as the first potential changing element included in the waveform PP7. The drive signal Com-B as the second drive signal has the waveform PS2 as the second potential changing element in which the potential changes from the reference potential V0 to the potential VS as the first potential from the start point of the control period TQ2 as the first period to a time point corresponding to a start point of the waveform PP3.

Therefore, in the first period, as compared to a case where the time point of generation of the waveform PS2 is included in the period in which the waveform PP4 and the waveform PP5 are generated, an influence of application of the vibration of the neighboring discharge section DK due to Com-B as the second drive signal to the determination target discharge section DS can be reduced.

In the ink jet printer 1 according to this embodiment, the plurality of discharge sections D[m] include the normal discharge section DT as the third discharge section that discharges the liquid in the cavity 322 as a third pressure chamber in accordance with displacement of the piezoelectric element PZ[m] as a third piezoelectric element. The normal discharge section DT is provided in a position more distant from the determination target discharge section DS as the first discharge section than the neighboring discharge section DK as the second discharge section. The drive signal generation unit 4 as the generation section generates the drive signal Com-C as a third drive signal. The drive signal Com-C has the waveform PU1 or the waveform PU3 as the second drive pulse that displaces the piezoelectric element PZ[m] to an extent in which the normal discharge section DT does not discharge the liquid in the cavity 322 in at least one of a period earlier than the control period TQ3 as the second period in the drive cycle and a period later than the control period TQ3 in the drive cycle. The drive signal Com-C has the waveform PU2 as the fourth potential maintaining element that maintains the potential in the control period TQ3.

Therefore, the ink jet printer 1 can suppress thickening of the liquid in the cavity 322 by applying micro vibration to the piezoelectric element PZ[m] of the normal discharge section DT.

In the ink jet printer 1 according to this embodiment, the drive signal generation unit 4 corrects a shape of the waveform PU1 or the waveform PU3 as the second drive pulse, based on the temperature detected by the temperature detection section 5.

Therefore, the ink jet printer 1 changes an amplitude of the micro vibration applied to the piezoelectric element PZ[m] in accordance with the environmental temperature, so that the ink jet printer 1 can correspond to change of viscosity of the liquid in the cavity 322 in accordance with the environmental temperature.

In the ink jet printer 1 according to this embodiment, the potential VS as the first potential is the reference potential V0 or less.

Therefore, the ink jet printer 1 can make displacement of the piezoelectric element PZ[m] of the neighboring discharge section DK constant at a lower potential.

As described above, a method for driving the ink jet printer 1 as a liquid discharge apparatus according to this embodiment is a method for driving the ink jet printer 1 including the recording head 32 as the liquid discharge head that includes the plurality of discharge section discharge sections D[m] including the determination target discharge section DS as the first discharge section and the neighboring discharge section DK as the second discharge section, the drive signal generation unit 4 as the generation section, the detection circuit 33 as the vibration detection section, and the temperature detection section 5.

The determination target discharge section DS discharges the liquid in the cavity 322 as the first pressure chamber in accordance with displacement of the piezoelectric element PZ[m] as the first piezoelectric element. The neighboring discharge section DK discharges the liquid in the cavity 322 as the second pressure chamber in accordance with displacement of the piezoelectric element PZ[m] as the second piezoelectric element. The drive signal generation unit 4 generates the first drive signal Com-A that displaces the piezoelectric element PZ[m] as the first piezoelectric element and the second drive signal Com-B that displaces the piezoelectric element PZ[m] as the second piezoelectric element. The detection circuit 33 detects the remaining vibration that occurs in the determination target discharge section DS after the drive signal Com-A is supplied to the piezoelectric element PZ[m] as the first piezoelectric element. The temperature detection section 5 detects the temperature of the recording head 32.

The drive signal Com-A has the waveform PP7 as the first drive pulse in the control period TQ2 as the first period of the drive cycle. The drive signal Com-B has the waveform PS1 as the first reference potential maintaining element, the waveform PS3 as the first potential maintaining element, and the waveform PS4 as the second reference potential maintaining element. The waveform PS1 maintains the reference potential V0 in the control period TQ1 as the start period including the start point of the drive cycle. The waveform PS3 maintains the potential VS as the first potential in the control period TQ3 as the second period following the control period TQ2. The waveform PS4 starts after the end of the control period TQ3 and maintains the reference potential V0 in the control period TQ4 as the end period including the end point of the drive cycle.

In the above-described driving method, in the control period TQ2, the remaining vibration that occurs in the determination target discharge section DS is detected. In the above-described driving method, the reference potential V0 is corrected based on the detected temperature. In the above-described driving method, regardless of the detected temperature, the potential VS is maintained at a constant potential.

In the known technology, there has been the following problem. That is, an amount of displacement of the piezoelectric element PZ[m] depends the potential of the supply drive signal Vin[m]. Therefore, in a case where, as in the known technologies, the reference potential V0 is corrected based on the environmental temperature, the amount of displacement of the piezoelectric element PZ[m] of the neighboring discharge section DK fluctuates in accordance with the environmental temperature. The piezoelectric element PZ[m] of the determination target discharge section DS receives a stress in a size corresponding to displacement of the neighboring discharge section DK. Therefore, in accordance with change of the environmental temperature, when the amount of displacement of the piezoelectric element PZ[m] of the neighboring discharge section DK fluctuates, the stress received by the determination target discharge section DS from the neighboring discharge section DK fluctuates.

When the stress received by the determination target discharge section DS from the neighboring discharge section DK fluctuates, characteristics of the remaining vibration that occurs in the determination target discharge section DS fluctuates.

As a result, when, as in the known technologies, the reference potential V0 is corrected based on the environmental temperature, characteristics of the remaining vibration that occurs in the determination target discharge section DS fluctuates due to change of the environmental temperature. Accordingly, in the known technologies, the discharge state of the ink cannot be accurately determined based on the remaining vibration that occurs in the determination target discharge section DS.

On the other hand, in the method for driving the ink jet printer 1 as a liquid discharge apparatus according to this embodiment, in the control period TQ3 in which the remaining vibration that occurs in the determination target discharge section DS is detected, the potential VS of the second drive signal Com-B that displaces the piezoelectric element PZ[m] of the neighboring discharge section DK is maintained at a constant potential, regardless of the environmental temperature. Accordingly, in this embodiment, displacement of the piezoelectric element PZ[m] of the neighboring discharge section DK due to change of the environmental temperature can be suppressed. As a result, in this embodiment, fluctuation of characteristics of the remaining vibration that occurs in the determination target discharge section DS is suppressed. Therefore, in this embodiment, even when the environmental temperature fluctuates, the discharge state of the ink can be accurately determined based on the remaining vibration that occurs in the determination target discharge section DS.

2: Second Embodiment

With reference to FIG. 10 to FIG. 13, an ink jet printer 1A according to a second embodiment will be described below. Note that, for simplifying description, different points between the ink jet printer 1A according to the second embodiment and the ink jet printer 1 according to the first embodiment will be mainly described below. Among components of the ink jet printer 1A according to the second embodiment, the same components as those of the ink jet printer 1 according to the first embodiment will be denoted by the same reference symbols and description of functions thereof will be sometimes omitted.

In the ink jet printer 1 according to the first embodiment, the drive signal generation unit 4 generates three types of signals Com, that is, the drive signal Com-A, the drive signal Com-B, and the drive signal Com-C. The drive signal Com-A is a signal that drives the determination target discharge section DS. The drive signal Com-B is a signal that drives the neighboring discharge section DK. The drive signal Com-C is a signal that drives the normal discharge section DT.

On the other hand, in the ink jet printer 1A according to the second embodiment, the drive signal generation unit 4 generates two types signals Com, that is, the drive signal Com-A and the drive signal Com-B. The drive signal Com-A is a signal that drives the determination target discharge section DS. The drive signal Com-B is a signal that drives both the neighboring discharge section DK and the normal discharge section DT.

2-1: Outline of Ink Jet Printer

An outline of the ink jet printer 1A according to the second embodiment is the same as the outline of the ink jet printer 1 according to the first embodiment, and therefore, description thereof will be omitted.

2-2: Outline of Head Unit

Figure 10:
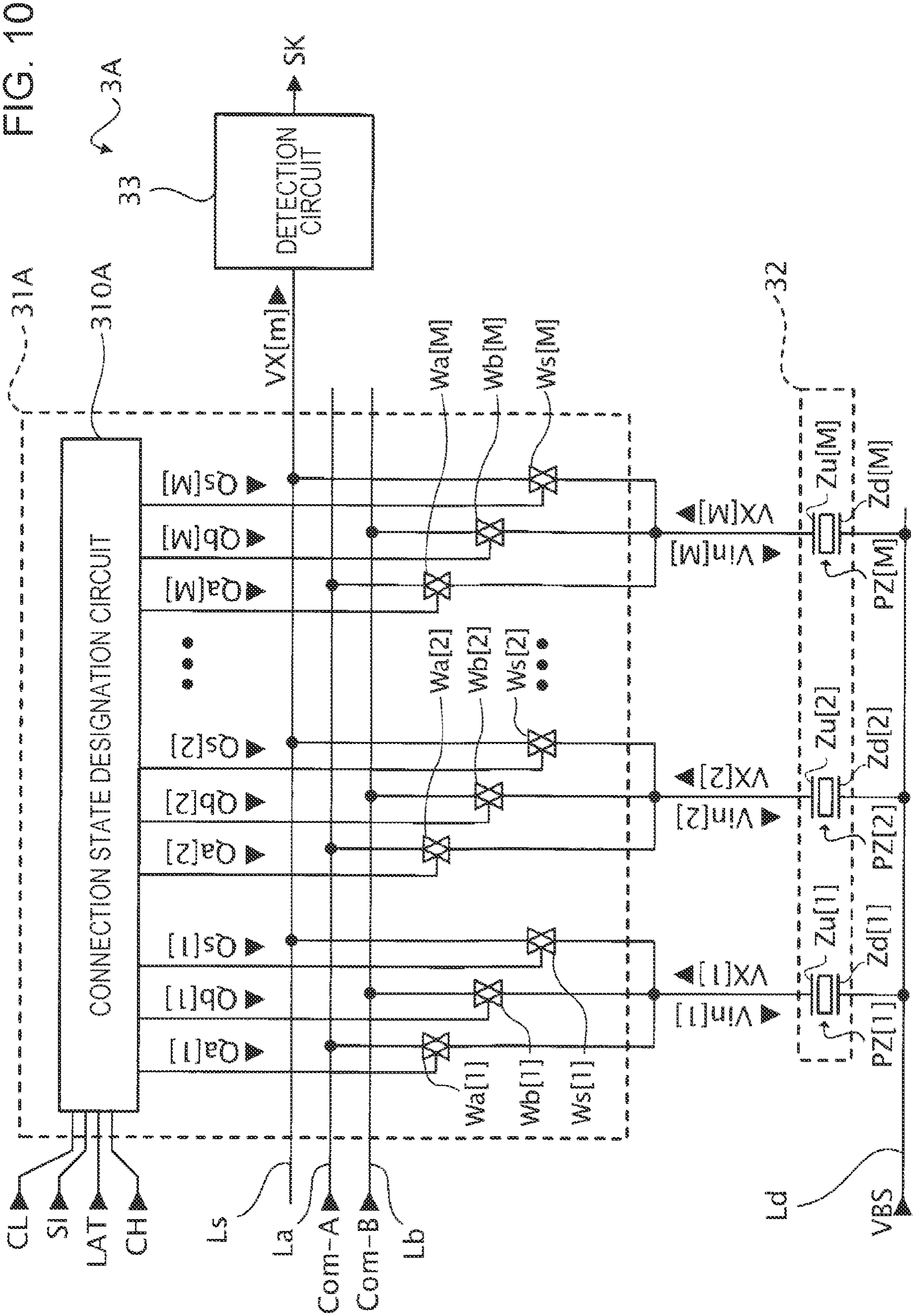
FIG. 10 is a block diagram illustrating an example of a configuration of a head unit.

With reference to FIG. 10, a configuration of a head unit 3A will be described below. FIG. 10 is a block diagram illustrating an example of the configuration of the head unit 3A.

The head unit 3A is different from the head unit 3 according to the first embodiment, and the wiring Lc through which the drive signal Com-C is supplied from the drive signal generation unit 4 is not an essential component. In a supply circuit 31A, M switches Wc[1] to Wc[M] corresponding to the M discharge sections D[1] to D[M] in a one-to-one manner are not essential components. A connection state designation circuit 310A generates, based on at least some of the print signal SI, the latch signal LAT, and the change signal CH that are supplied from the control unit 2, a connection state designation signal Qa[m] that designates on and off of a switch Wa[m], a connection state designation signal Qb[m] that designates on and off of a switch Wb[m], and a connection state designation signal Qs[m] that designates on and off of a switch Ws[m].

2-3: Operation of Head Unit

Figure 11:
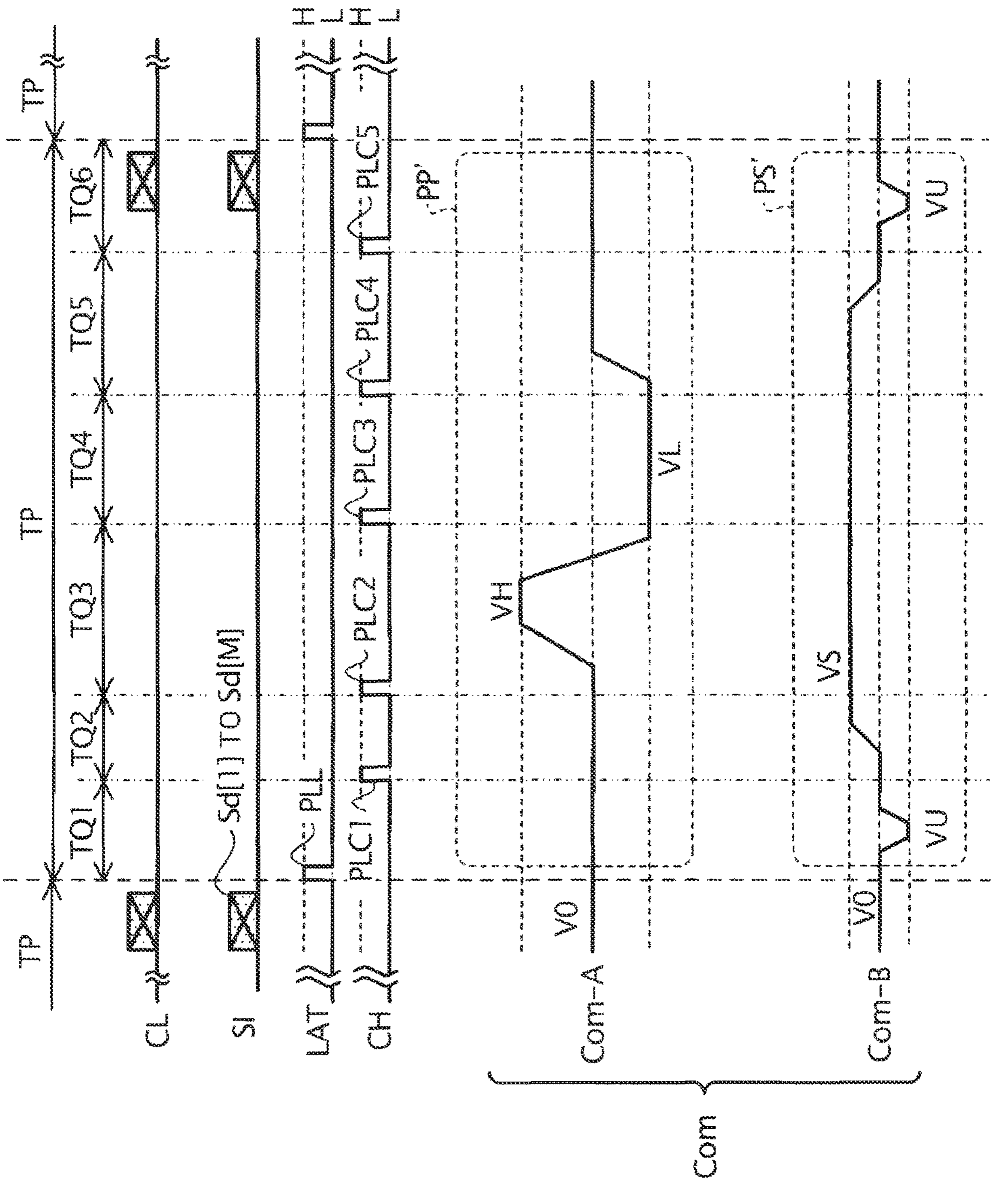
FIG. 11 is an example timing chart illustrating an operation of an ink jet printer when discharge state determination is performed in the unit period.
Figure 12:
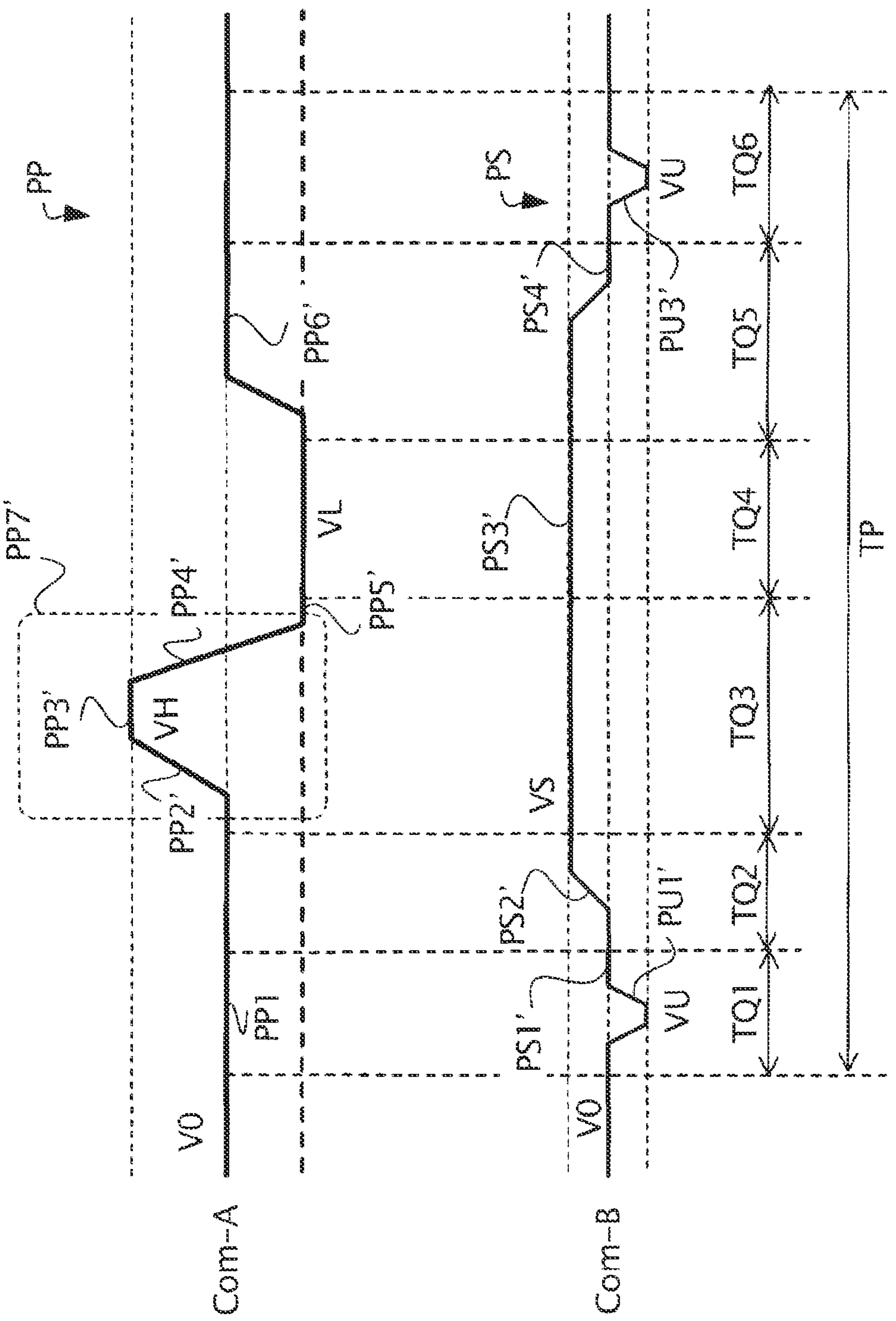
FIG. 12 is an example timing chart illustrating drive signals in the unit period.

FIG. 11 is an example timing chart illustrating an operation of the ink jet printer 1A when discharge state determination is performed in the unit period TP. FIG. 12 is an example timing chart illustrating the drive signal Com-A and the drive signal Com-B in the unit period TP.

As illustrated in FIG. 11, a control unit 2 outputs the change signal CH having the pulse PLC in the unit period TP. The control unit 2 divides the unit period TP into a control period TQ1 from a rising edge of a pulse PLL to a rising edge of a pulse PLC1, a control period TQ2 from the rising edge of the pulse PLC1 to a rising edge of a pulse PLC2, a control period TQ3 from the rising edge of the pulse PLC2 to a rising edge of a pulse PLC3, a control period TQ4 from the rising edge of the pulse PLC3 to a rising edge of a pulse PLC4, a control period TQ5 from the riding edge of the pulse PLC4 to a rising edge of a pulse PLC5, and a control period TQ6 from the rising edge of the pulse PLC5 to a rising edge of a pulse PLL.

As illustrated in FIG. 11, in this embodiment, the drive signal Com-A has a waveform PP' provided in the unit period TP. Herein, the waveform PP' is a waveform that maintains the reference potential V0 in the control period TQ1 and the control period TQ2, changes from the reference potential V0 to the potential VH and then to the potential VL in the control period TQ3, maintains the potential VL in the control period TQ4, changes from the potential VL to the reference potential V0 in the control period TQ5, and maintains the reference potential V0 in the control period TQ6.

As illustrated in FIG. 12, hereinafter, a portion of the waveform PP' that maintains the reference potential V0 in the control period TQ1 and the control period TQ2 will be referred to as a "waveform PP1'." The waveform PP1' is an example of the "third reference potential maintaining element." A portion of the waveform PP' that changes from the reference potential V0 to the potential VH in the control period TQ3 will be referred to as a "waveform PP2'." The waveform PP2' is an example of the "third potential changing element." A portion of the waveform PP' that maintains the potential VH in the control period TQ3 will be referred to as a "waveform PP3'." The waveform PP3' is an example of the "third potential maintaining element." A portion of the waveform PP' that changes from the potential VH to the potential VL in the control period TQ3 will be referred to as a "waveform PP4'." The waveform PP4' is an example of the "first potential changing element." A portion of the waveform PP' that maintains the potential VL in the control period TQ3 will be referred to as a "waveform PP5'." The waveform PP5' is an example of the "second potential maintaining element." A portion of the waveform PP' that maintains the reference potential V0 in the control period TQ5 and the control period TQ6 will be referred to as a "waveform PP6'." The waveform PP6' is an example of the "fourth reference potential maintaining element." A waveform PP7 that is a total of the waveform PP2', the waveform PP3', and the waveform PP4' is an example of the "first drive pulse."

As illustrated in FIG. 11, in this embodiment, the drive signal Com-B has a waveform PS' provided in the unit period TP. Herein, in the control period TQ1, the waveform PS' changes, after maintaining the reference potential V0, from the reference potential V0 to the potential VU that is lower than the reference potential V0, changes, after maintaining the potential VU, from the potential VU to the reference potential V0, and maintains the reference potential V0. In the control period TQ2, the waveform PS' changes, after maintaining the reference potential V0, from the reference potential V0 to the potential VS that is higher than the reference potential V0, and maintains the potential VS. In the control period TQ3 and control period TQ4, the waveform PS' maintains the potential VS. In the control period TQ5, the waveform PS' changes, after maintaining the potential VS, from the potential VS to the reference potential V0, and maintains the reference potential V0. In the control period TQ6, the waveform PS' changes, after maintaining the reference potential V0, from the reference potential V0 to the potential VU, changes, after maintaining the potential VU, from the potential VU to the reference potential V0, and maintains the reference potential V0.

As illustrated in FIG. 12, a portion of the waveform PS' that changes from the reference potential V0 to the potential VU in the control period TQ1 and changes, after maintaining the potential VU, from the potential VU to the reference potential V0 will be referred to as a "waveform PU1'." A portion of the waveform PS' that maintains the reference potential V0 in the control period TQ1 and the control period TQ2 will be referred to as a "waveform PS1'." The waveform PS1' is an example of the "first reference potential maintaining element." A portion of the waveform PS' that changes from the reference potential V0 to the potential VS in the control period TQ2 will be referred to as a "waveform PS2'." The waveform PS2' is an example of the "second potential changing element." A portion of the waveform PS' that maintains the potential VS in the control period TQ4 will be referred to as a "waveform PS3'." The waveform PS3' is an example of the "first potential maintaining element." A portion of the waveform PS' that changes from the reference potential V0 to the potential VU and changes, after maintaining the potential VU, from the potential VU to the reference potential V0 in the control period TQ6 will be referred to as a "waveform PU3'." Note that the waveform PU1' and the waveform PU3' are examples of the "second drive pulse." A portion of the waveform PS' that maintains the reference potential V0 in the control period TQ5 will be referred to as a "waveform PS4'." The waveform PS4' is an example of the "second reference potential maintaining element."

FIG. 13 is a table illustrating a relationship between the individual designation signal Sd[m], the connection state designation signal Qa[m], the connection state designation signal Qb[m], and the connection state designation signal Qs[m] in the unit period TP.

As illustrated in FIG. 13, when the individual designation signal Sd[m] is the value "1" designating the discharge section D[m] as the determination target discharge section DS in the unit period TP, the connection state designation circuit 310A sets the connection state designation signal Qa[m] to a high level in the control period TQ1, the control period TQ2, the control period TQ3, the control period TQ5, and the control period TQ6, and sets the connection state designation signal Qs[m] to a high level in the control period TQ4. In this case, the switch Wa[m] is turned on in the control period TQ1, the control period TQ2, and the control period TQ3, the control period TQ5, and the control period TQ6, and the switch Ws[m] is turned on in the control period TQ4. Therefore, when vibration occurs in the discharge section D[m] as a result of driving of the discharge section D[m] designated as the determination target discharge section DS by the supply drive signal Vin[m] having the waveform PP2' and the waveform PP4' in the control period TQ3, the vibration remains in the control period TQ4. In the control period TQ4, when the vibration remains in the discharge section D[m], the potential of the upper electrode Zu[m] provided in the discharge section D[m] changes. Then, in the control period TQ4, when the vibration remains in the discharge section D[m], the potential of the upper electrode Zu[m] is supplied to the detection circuit 33 as the detection potential signal VX[m] via the switch Ws[m].

That is, the waveform of the detection potential signal VX[m] detected from the discharge section D[m] in the control period TQ4 exhibits the waveform of the vibration remaining in the discharge section D[m] in the control period TQ4. Then, the waveform of the detection signal SK[m] generated based on the detection potential signal VX[m] detected from the discharge section D[m] in the control period TQ4 exhibits the waveform of the vibration remaining in the discharge section D[m] in the control period TQ4.

When the individual designation signal Sd[m] is the value "2" designating the discharge section D[m] as the neighboring discharge section DK in the unit period TP, the connection state designation circuit 310A sets the connection state designation signal Qb[m] to a low level in the control period TQ1 and the control period TQ6, and sets the connection state designation signal Qb[m] to a high level in the control period TQ2, the control period TQ3, the control period TQ4, and the control period TQ5. In this case, the switch Wb[m] is turned on in the control period TQ2, the control period TQ3, the control period TQ4, and the control period TQ5. Therefore, as a result of driving of the discharge section D[m] designated as the neighboring discharge section DK by the supply drive signal Vin[m] having the waveform PS3' in the control period TQ4, vibration does not occur in the discharge section D[m] in the control period TQ4.

When the individual designation signal Sd[m] is the value "3" designating the discharge section D[m] as the normal discharge section DT in the unit period TP, the connection state designation circuit 310A sets the connection state designation signal Qb[m] to a high level in the control period TQ1 and the control period TQ6, and sets the connection state designation signal Qb[m] to a low level in the control period TQ2, the control period TQ3, the control period TQ4, and the control period TQ5. In this case, the switch Wb[m] is turned on in the control period TQ1 and the control period TQ6. Therefore, as a result of driving of the discharge section D[m] designated as the normal discharge section DT by the supply drive signal Vin[m] having the waveform PU1' in the control period TQ1 and the waveform PU3' in the control period TQ6, micro vibration occurs in the discharge section D[m] but vibration does not occur in the discharge section D[m] in the control period TQ4.

3: Modified Examples

Each of the above-described embodiments can be variously modified. Specific modification modes will be described below. One or more of the modes described below can be combined with one or more of modes described in the above-described embodiments as appropriate, provided that mutual contradiction does not arise. Note that the same reference symbols as those used in the description of the above-described embodiments will be used for elements in the modified examples described below having the same effects and functions as in the above-described embodiments, and detailed description thereof will be omitted as appropriate.

3-1: First Modified Example

In the above-described embodiments, the neighboring discharge section DK is a discharge section D[m] that is adjacent to the determination target discharge section DS. However, the neighboring discharge section DK is not limited to a discharge section D[m] that is adjacent to the determination target discharge section DS. For example, the neighboring discharge section DK may be any one of other discharge sections D[m] than the determination target discharge section DS. The neighboring discharge section DK may be a discharge section D included in a neighboring area including the determination target discharge section DS among the M discharge sections D. Herein, the neighboring area may be, for example, an area that includes the determination target discharge section DS and is located in a position within a predetermined distance from the determination target discharge section DS. The neighboring area may also be an area defined such that a predetermined number of discharge sections D including the neighboring discharge section DK among the M discharge sections D are included therein. In this case, the predetermined number may be, for example, a value of three or more and 30 or less.

3-2: Second Modified Example

In the above-described embodiments, the temperature detection section 5 generates the temperature detection signal TI and supplies the generated temperature detection signal TI to the drive signal generation unit 4. However, the temperature detection section 5 may be configured to supply the temperature detection signal TI to the control unit 2. In this case, the control unit 2 corrects a waveform designation signal dCom, based on the temperature detection signal TI. In this case, the drive signal generation unit 4 and the control unit 2 are examples of the "generation section."

What is claimed is:

1. A liquid discharge apparatus comprising:
- a liquid discharge head that includes a plurality of discharge sections including
  - a first discharge section that is configured to discharge a liquid in a first pressure chamber in accordance with displacement of a first piezoelectric element, and
  - a second discharge section that is configured to discharge a liquid in a second pressure chamber in accordance with displacement of a second piezoelectric element;
- a generation section that is configured to generate
  - a first drive signal that displaces the first piezoelectric element, and
  - a second drive signal that displaces the second piezoelectric element;
- a vibration detection section that is configured to detect remaining vibration that occurs in the first discharge section after the first drive signal is supplied to the first piezoelectric element; and a temperature detection section that is configured to detect a temperature of the liquid discharge head, wherein the first drive signal includes a first drive pulse that is configured to displace the first piezoelectric element in a first period of a drive cycle, the second drive signal includes a first reference potential maintaining element that maintains a reference potential in a first start period including a start point of the drive cycle, a first potential maintaining element that maintains a first potential in a second period of the drive cycle following the first period, and a second reference potential maintaining element that maintains the reference potential in a first end period that starts after an end of the second period and includes an end point of the drive cycle, the vibration detection section detects the remaining vibration that occurs in the first discharge section in the second period, and the generation section corrects the reference potential, based on the temperature detected by the temperature detection section, and maintains the first potential at a constant potential, regardless of the temperature detected by the temperature detection section, the plurality of discharge sections include a third discharge section that is configured to discharge a liquid in a third pressure chamber in accordance with displacement of a third piezoelectric element, the third discharge section is provided in a position more distant from the first discharge section than the second discharge section, the generation section generates a third drive signal that displaces the third piezoelectric element, and the third drive signal includes a second drive pulse that displaces the third piezoelectric element to an extent in which the third discharge section does not discharge the liquid in the third pressure chamber in at least one of a period earlier than the second period in the drive cycle and a period later than the second period in the drive cycle and a fourth potential maintaining element that maintains the potential in the second period.

2. The liquid discharge apparatus according to claim 1, wherein the generation section maintains a shape of a waveform of the first drive pulse, regardless of the temperature detected by the temperature detection section.

3. The liquid discharge apparatus according to claim 1, wherein the first drive signal includes a third reference potential maintaining element that maintains the reference potential in a second start period including the start point of the drive cycle and a fourth reference potential maintaining element that maintains the reference potential in a second end period that starts after an end of the second period and includes the end point of the drive cycle.

4. The liquid discharge apparatus according to claim 3, wherein the first drive pulse includes a first potential changing element that changes a potential, the first drive signal includes a second potential maintaining element that maintains a potential in a terminal end of the first potential changing element in a period from a time point corresponding to the terminal end of the first potential changing element to a start point of the second period, and the second drive signal includes a second potential changing element in which the potential changes from the reference potential to the first potential in a period that is from a start point of the first period to a start point of the first potential changing element.

5. The liquid discharge apparatus according to claim 3, wherein the first drive pulse includes a third potential changing element in which the potential changes from the reference potential to a second potential and a third potential maintaining element that maintains a potential of a terminal end of the third potential changing element from a time point corresponding to the terminal end of the third potential changing element, a start point of the first potential changing element included in the first drive pulse is a terminal end of the third potential maintaining element, and the second drive signal includes a second potential changing element in which the potential changes from the reference potential to the first potential in a period that is from a start point of the first period to a start point of the third potential maintaining element.

6. The liquid discharge apparatus according to claim 1, wherein the generation section corrects a shape of a waveform of the second drive pulse, based on the temperature detected by the temperature detection section.

7. The liquid discharge apparatus according to claim 1, wherein the first potential is the reference potential or less.

8. A method for driving a liquid discharge apparatus, the liquid discharge apparatus including a liquid discharge head that includes a plurality of discharge sections including a first discharge section that is configured to discharge a liquid in a first pressure chamber in accordance with displacement of a first piezoelectric element, and a second discharge section that is configured to discharge a liquid in a second pressure chamber in accordance with displacement of a second piezoelectric element, a generation section that is configured to generate a first drive signal that is configured to displace the first piezoelectric element, and a second drive signal that is configured to displace the second piezoelectric element, a vibration detection section that is configured to detect remaining vibration that occurs in the first discharge section, after the first drive signal is supplied to the first piezoelectric element, and a temperature detection section that is configured to detect a temperature of the liquid discharge head, the first drive signal including a first drive pulse that is configured to displace the first piezoelectric element in a first period of a drive cycle, the second drive signal including a first reference potential maintaining element that maintains a reference potential in a first start period including a start point of the drive cycle, a first potential maintaining element that maintains a first potential in a second period of the drive cycle following the first period, and a second reference potential maintaining element that maintains the reference potential in a first end period that starts after an end of the second period and includes an end point of the drive cycle, the plurality of discharge sections include a third discharge section that is configured to discharge a liquid in a third pressure chamber in accordance with displacement of a third piezoelectric element, the third discharge section is provided in a position more distant from the first discharge section than the second discharge section, the generation section generates a third drive signal that displaces the third piezoelectric element, and the third drive signal includes a second drive pulse that displaces the third piezoelectric element to an extent in which the third discharge section does not discharge the liquid in the third pressure chamber in at least one of a period earlier than the second period in the drive cycle and a period later than the second period in the drive cycle and a fourth potential maintaining element that maintains the potential in the second period the method comprising:

detecting the remaining vibration that occurs in the first discharge section in the second period;

correcting the reference potential, based on the temperature detected by the temperature detection section; and maintaining the first potential at a constant potential, regardless of the temperature detected by the temperature detection section.

* * * * *